United States Patent
Fukushima et al.

(10) Patent No.: US 11,845,003 B2
(45) Date of Patent: Dec. 19, 2023

(54) GAME DEVICE AND GOLF GAME CONTROL METHOD

(71) Applicant: Sony Interactive Entertainment Inc., Tokyo (JP)

(72) Inventors: Reina Fukushima, Tokyo (JP); Kentaro Motomura, Tokyo (JP); Tatsuo Shinozaki, Tokyo (JP); Takashi Namima, Tokyo (JP); Masashi Muramori, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 41 days.

(21) Appl. No.: 17/253,843

(22) PCT Filed: Sep. 4, 2018

(86) PCT No.: PCT/JP2018/032778
§ 371 (c)(1),
(2) Date: Dec. 18, 2020

(87) PCT Pub. No.: WO2020/026458
PCT Pub. Date: Feb. 6, 2020

(65) Prior Publication Data
US 2021/0260472 A1    Aug. 26, 2021

(30) Foreign Application Priority Data
Jul. 30, 2018 (WO) .................. PCT/JP2018/028450

(51) Int. Cl.
*A63F 13/285* (2014.01)
*A63F 13/245* (2014.01)
(Continued)

(52) U.S. Cl.
CPC .......... *A63F 13/285* (2014.09); *A63F 13/245* (2014.09); *A63F 13/428* (2014.09);
(Continued)

(58) Field of Classification Search
CPC .... A63F 13/213; A63F 13/245; A63F 13/285; A63F 13/428; A63F 13/53; A63F 13/577; A63F 13/812
See application file for complete search history.

(56) References Cited

U.S. PATENT DOCUMENTS 9,061,212 B2 *  6/2015  Kikuchi ................. A63F 13/58
9,478,109 B2 * 10/2016  Rihn ...................... G06T 15/00
(Continued)

FOREIGN PATENT DOCUMENTS

JP    2002123840 A    4/2002
JP    2008123061 A    5/2008
(Continued)

OTHER PUBLICATIONS

"Best VR Golf Game 2017? | Everyday Golf VR HTC Vive Gameplay & Giveaway." SweViver. Jul. 15, 2017. Published on YouTube. <https://www.youtube.com/watch?v=0GJ_9PpGA1l> (Year: 2017).*

(Continued)

*Primary Examiner* — William H McCulloch, Jr.
(74) *Attorney, Agent, or Firm* — Matthew B. Dernier, Esq.

(57) ABSTRACT

Provided is a golf game that is readily intuitively playable by a user. An input reception section receives an operation input indicating a motion of an input device gripped by the hands of the user. A control section controls a motion of a player character in a game space in accordance with the operation input. An image generation section generates a game image. When a golf club held by the player character comes into contact with the ground in the game space, the control section drives a stimulus generation section disposed in the input device to stimulate the user's hands gripping the input device.

11 Claims, 13 Drawing Sheets

(51) Int. Cl.
*A63F 13/428* (2014.01)
*A63F 13/53* (2014.01)
*A63F 13/577* (2014.01)
*A63F 13/812* (2014.01)

(52) U.S. Cl.
CPC ............ *A63F 13/53* (2014.09); *A63F 13/577* (2014.09); *A63F 13/812* (2014.09)

(56) References Cited

U.S. PATENT DOCUMENTS

| | | | |
|---|---|---|---|
| 9,604,136 B1* | 3/2017 | Ricky | A63B 69/3623 |
| 9,636,578 B1* | 5/2017 | Ricky | A63F 13/211 |
| 9,737,817 B1* | 8/2017 | Ricky | A63B 69/02 |
| 9,996,153 B1* | 6/2018 | Trotta | G06F 3/014 |
| 11,173,387 B2* | 11/2021 | Ricky | A63F 13/812 |
| 11,260,286 B2* | 3/2022 | Enokido | A63F 13/44 |
| 2007/0265104 A1* | 11/2007 | Haga | G10H 1/348 |
| | | | 473/37 |
| 2008/0059131 A1* | 3/2008 | Tokita | G06F 3/011 |
| | | | 703/5 |
| 2009/0036237 A1* | 2/2009 | Nipper | A63B 24/0006 |
| | | | 473/409 |
| 2010/0292007 A1 | 5/2010 | Rabin | |
| 2010/0201500 A1* | 8/2010 | Stirling | A61B 5/11 |
| | | | 340/407.1 |
| 2010/0245232 A1* | 9/2010 | Birnbaum | A63F 13/06 |
| | | | 345/156 |
| 2010/0261526 A1* | 10/2010 | Anderson | G06F 3/016 |
| | | | 345/157 |
| 2012/0052951 A1 | 3/2012 | Gregory | |
| 2012/0196684 A1 | 8/2012 | Richardson | |
| 2012/0309478 A1* | 12/2012 | Kotsugai | A63F 13/812 |
| | | | 463/31 |
| 2013/0017871 A1* | 1/2013 | Kikuchi | A63F 13/428 |
| | | | 463/3 |
| 2013/0239785 A1* | 9/2013 | Tabata | G10H 1/0008 |
| | | | 84/609 |
| 2014/0274398 A1* | 9/2014 | Grant | G06F 3/016 |
| | | | 463/37 |
| 2015/0328516 A1* | 11/2015 | Coza | A63B 71/0619 |
| | | | 700/91 |
| 2016/0189493 A1* | 6/2016 | Rihn | G06T 15/00 |
| | | | 340/407.1 |
| 2017/0072283 A1* | 3/2017 | Davisson | H04N 5/272 |
| 2018/0196523 A1 | 7/2018 | Arana | |
| 2019/0224528 A1* | 7/2019 | Omid-Zohoor | A61B 5/6806 |
| 2020/0316459 A1* | 10/2020 | Ricky | A63F 13/211 |
| 2020/0324195 A1* | 10/2020 | Enokido | A63F 13/285 |
| 2021/0260472 A1* | 8/2021 | Fukushima | A63F 13/428 |
| 2022/0152486 A1* | 5/2022 | Koda | G06F 3/016 |
| 2022/0355210 A1* | 11/2022 | Lee | A63F 13/812 |
| 2023/0032604 A1* | 2/2023 | Lee | A63B 24/0021 |

FOREIGN PATENT DOCUMENTS

| | | |
|---|---|---|
| JP | 2010225155 A | 10/2010 |
| JP | 2012125335 A | 7/2012 |
| JP | 2016049231 A | 4/2016 |
| JP | 2016126766 A | 7/2016 |

OTHER PUBLICATIONS

Extended European Search Report for corresponding EP Application No. 18928524, 8 pages, dated Mar. 2, 2022.
International Search Report for corresponding PCT Application No. PCT/JP2018032778, 4 pages, dated Oct. 9, 2018.
YouTube, "Everyday Golf VR Trailer," URL:https://www.youtube.com/watch?vv=izFGVnvbtoQ, May 22, 2017.

* cited by examiner

FIG.4
(a)
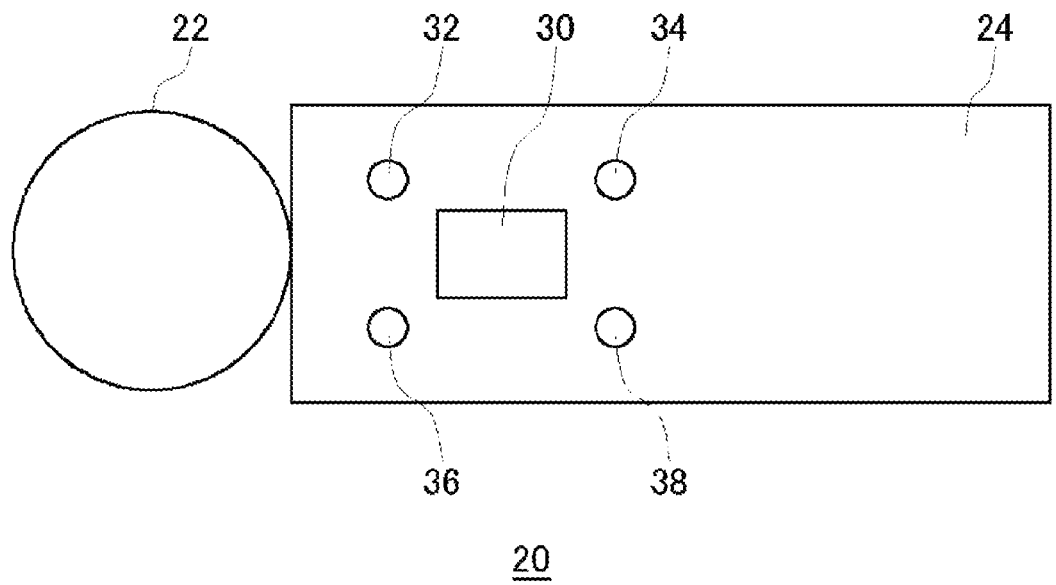
(b)
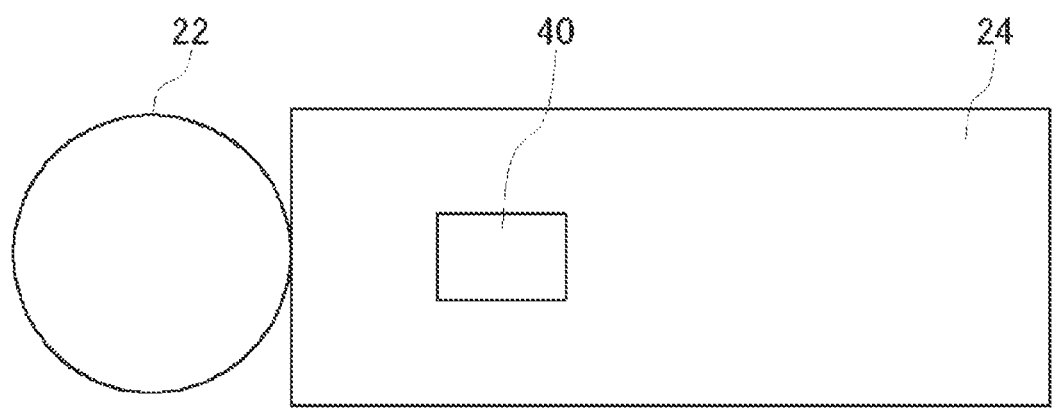

FIG.8
(a)
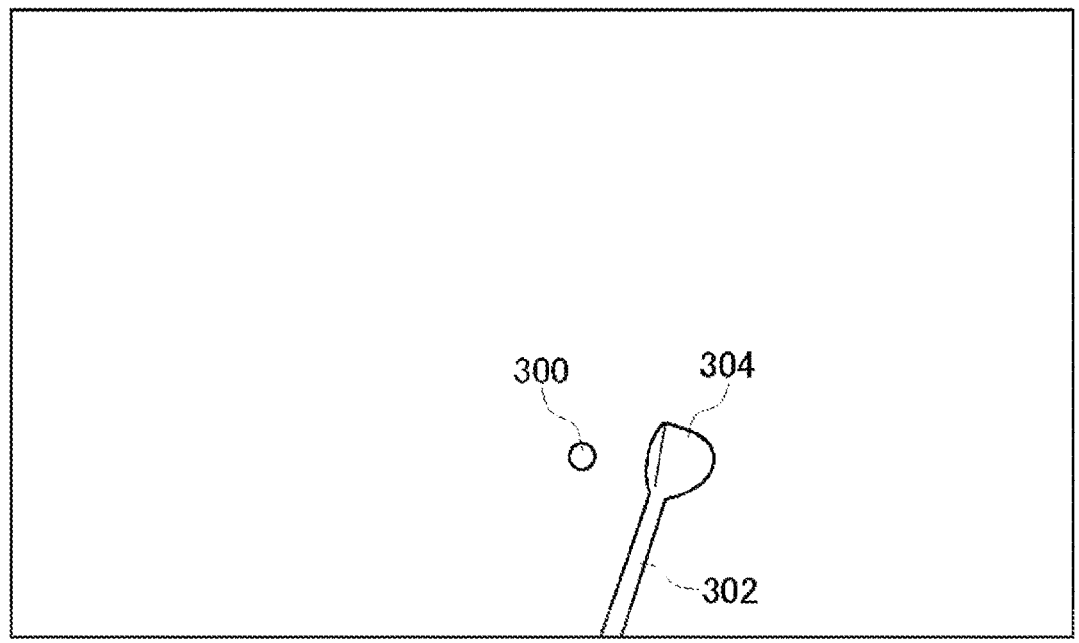
130
(b)
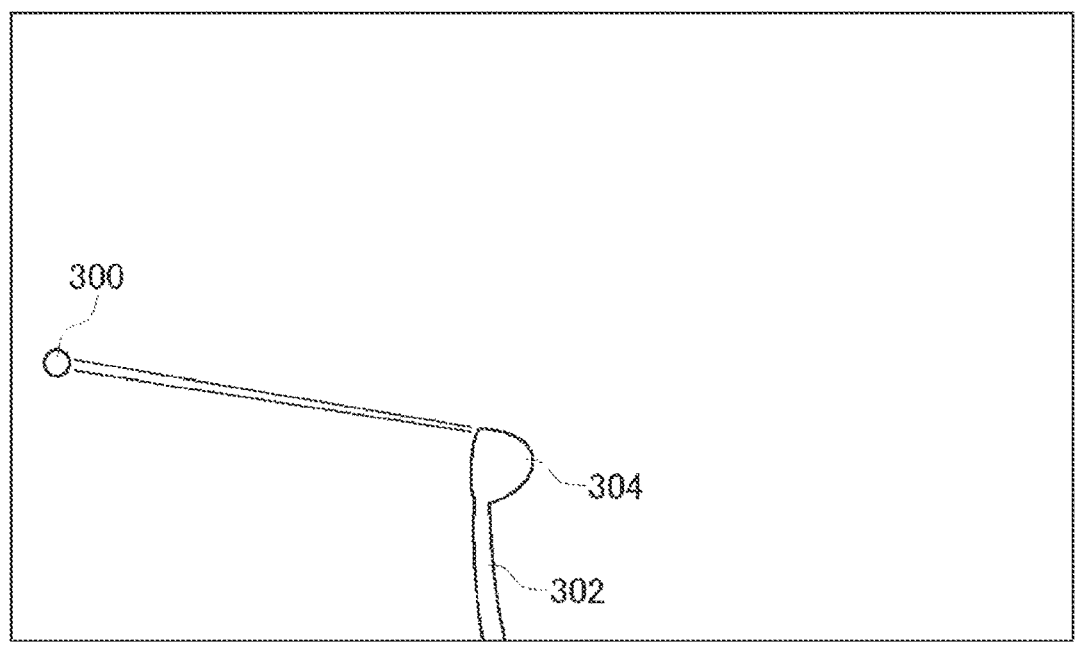
130

FIG.10
(a)
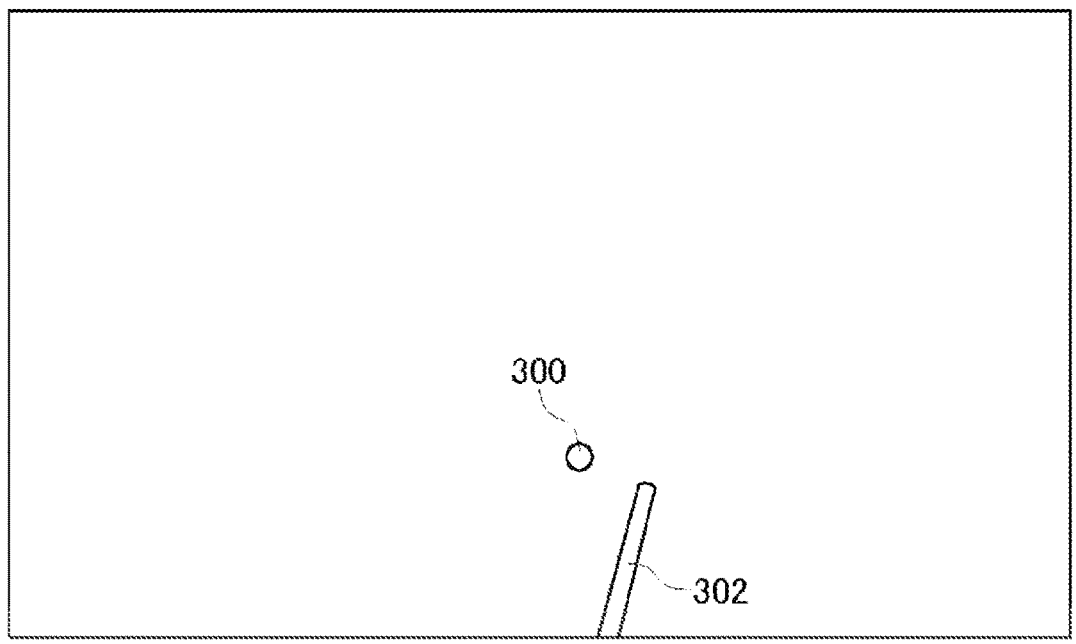
(b)
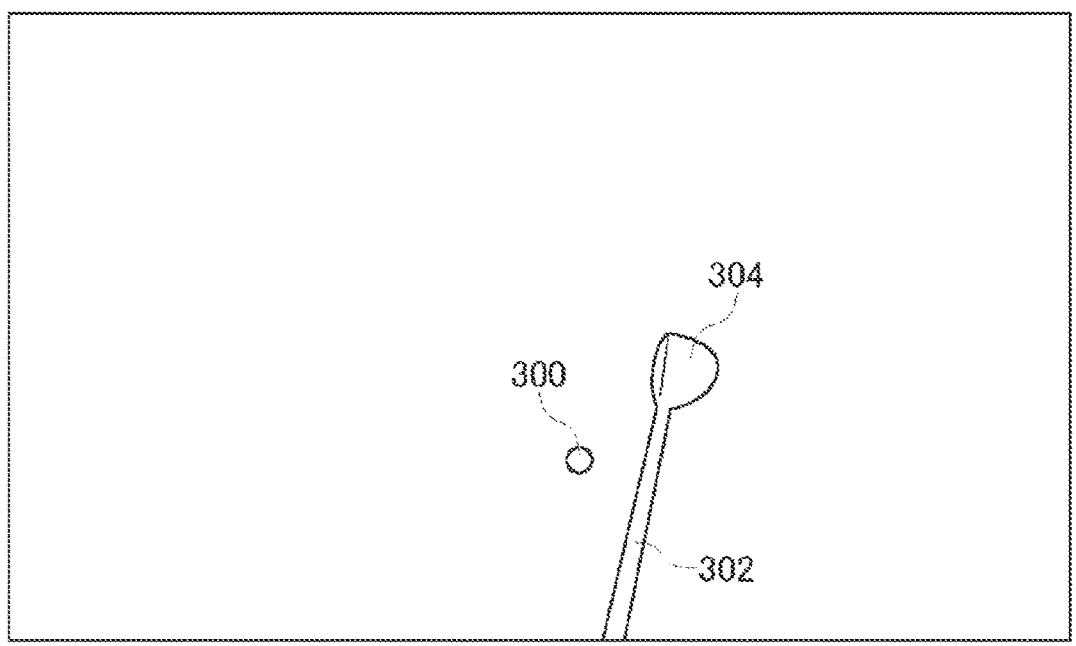

FIG.12
(a)
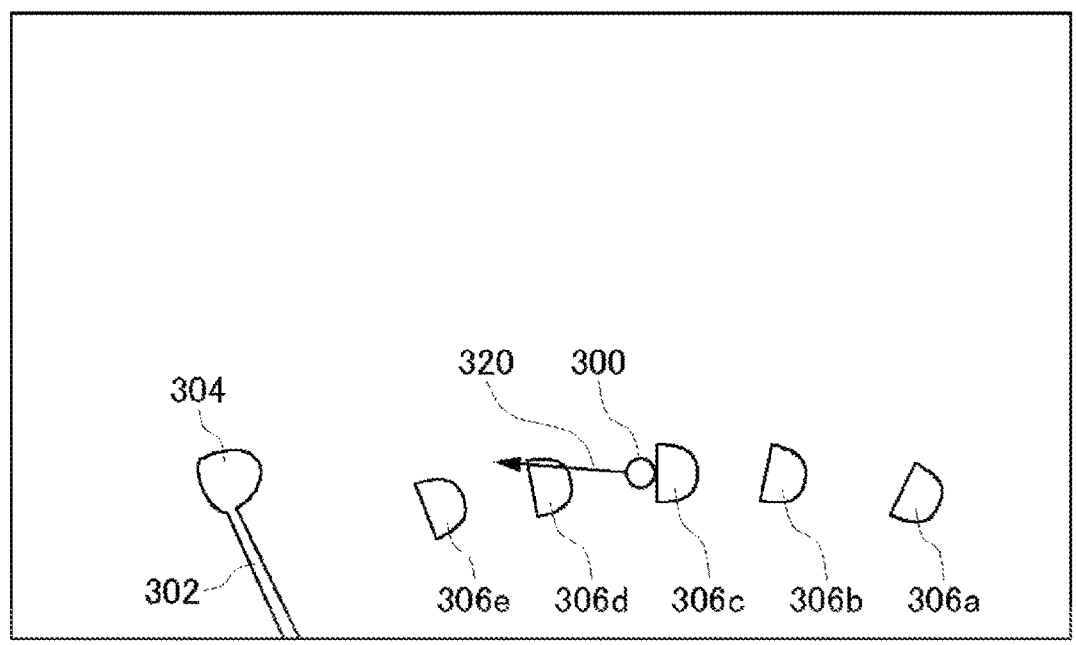
(b)
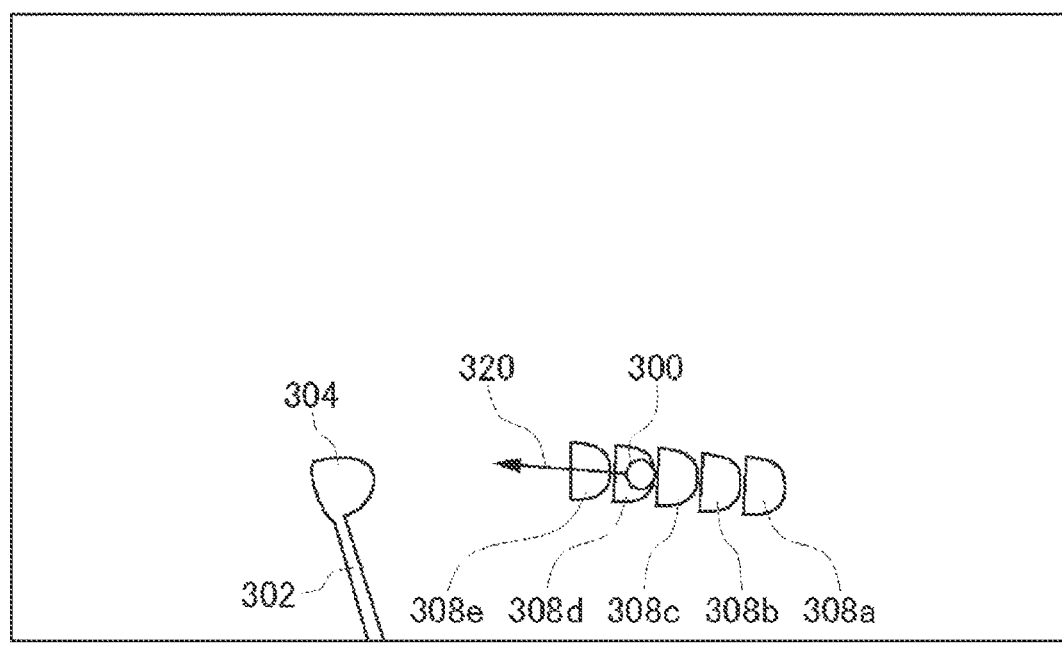

FIG.13
(a)
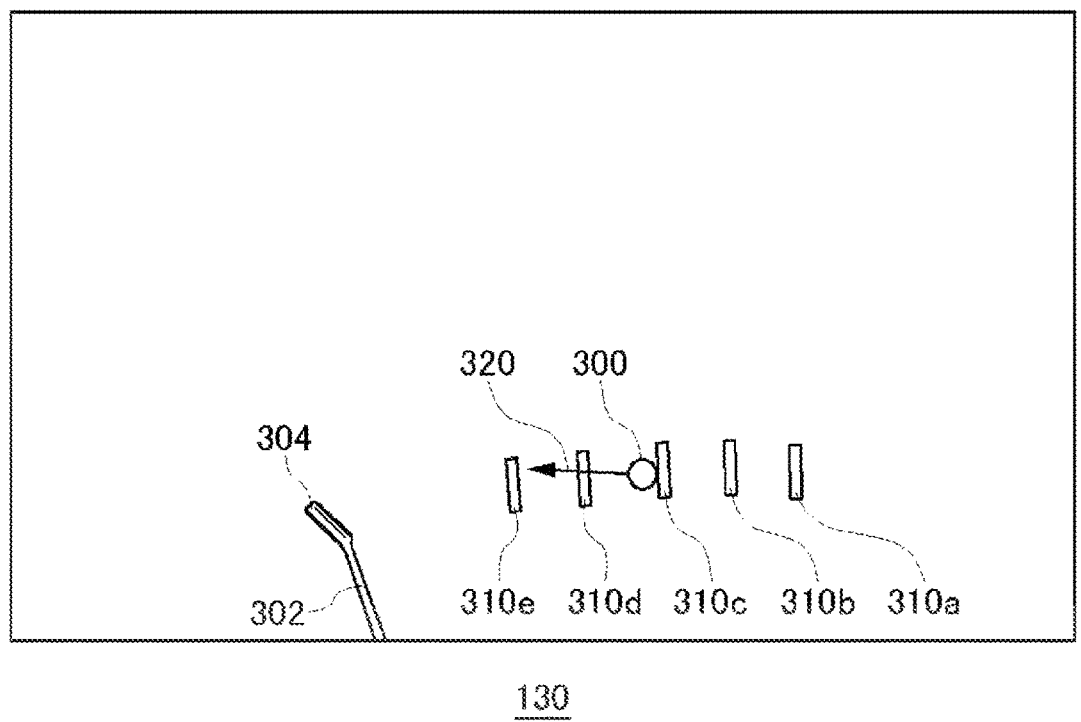
(b)
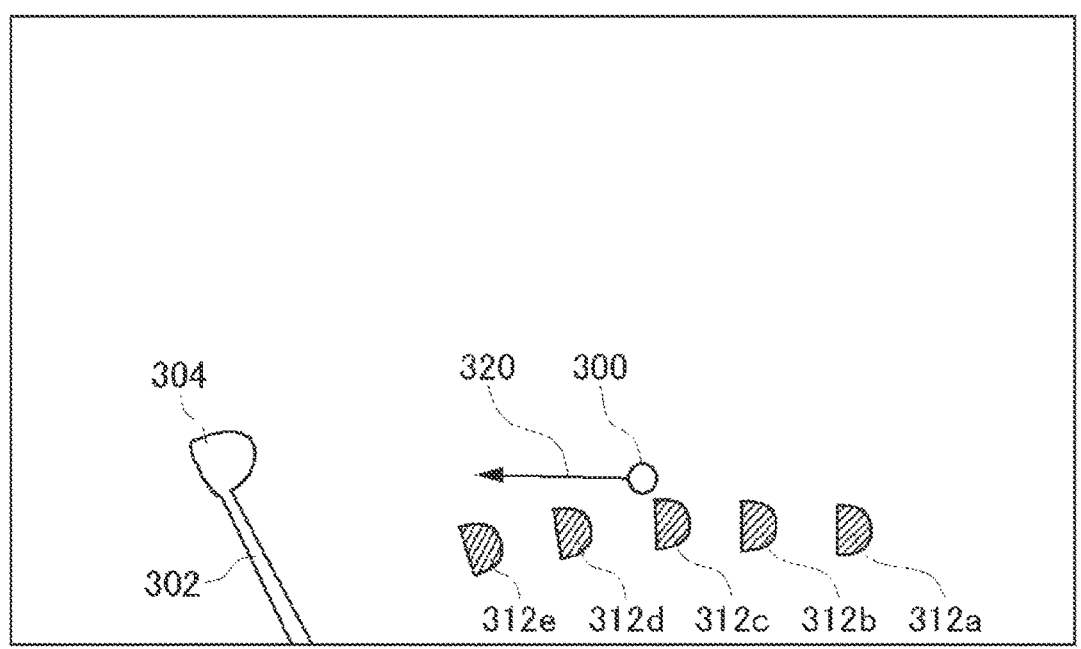

GAME DEVICE AND GOLF GAME CONTROL METHOD

TECHNICAL FIELD

The present invention relates to a technology for controlling a golf game.

BACKGROUND ART

Games in which a user operates a player character to play golf are popular. In the real world, too, golf is popular with a wide range of age groups.

CITATION LIST

Patent Literature

[PTL 1] Japanese Patent Laid-open No. 2012-125335

SUMMARY

Technical Problem

A head-mounted display (HMD) is mounted on the head of the user and configured to provide the user with a video world of virtual reality (VR). Recently, the HMD is connected in some cases to a game device to let the user operate a game controller so as to play a game while viewing a game image displayed on the HMD. The HMD provides a VR image in the entire field of view of the user. Therefore, the HMD enhances the sense of immersion into the video world and remarkably improves the entertaining capability of the game. The sense of immersion into the video world can be further enhanced by providing the HMD with a head-tracking function and generating the game image of a virtual three-dimensional space in conjunction with the posture of the user's head.

Widely circulated are golf games in which the user operates game controller buttons to swing a golf club. However, such golf games are significantly discrepant from real golf playing. Therefore, it is desired that the golf games readily intuitively playable by the user be developed.

The present invention has been made in view of the above circumstances. An object of the present invention is to provide a golf game that is readily intuitively playable by the user.

Solution to Problem

In order to solve the above problem, according to an aspect of the present invention, there is provided a game device including an input reception section that receives an operation input indicating a motion of an input device gripped by hands of a user, a control section that controls a motion of a player character in a game space in accordance with the operation input, and an image generation section that generates a game image. When a golf club held by the player character comes into contact with a ground in the game space, the control section drives a stimulus generation section disposed in the input device to stimulate the user's hands gripping the input device.

According to another aspect of the present invention, there is provided a golf game control method including a step of receiving an operation input indicating a motion of an input device gripped by hands of a user, a step of controlling a motion of a player character in a game space in accordance with the operation input, and a step of generating a game image. When a golf club held by the player character comes into contact with a ground in the game space, the golf game control method includes a step of driving a stimulus generation section disposed in the input device to stimulate the user's hands gripping the input device.

Any combinations of the above-described components and any conversions of expressions of the present invention between, for example, methods, devices, and systems are also effective as the aspects of the present invention.

Advantageous Effect of Invention

The present invention can provide a golf game that is readily intuitively playable.

BRIEF DESCRIPTION OF DRAWINGS

FIG. 4 is a set of diagrams illustrating an example of an external shape of an input device.

FIG. 8 is a set of diagrams illustrating examples of a game image displayed on a display panel.

FIG. 10 is a set of diagrams illustrating examples of the game image displayed on the display panel.

FIG. 12 is a set of diagrams illustrating examples of the game image displayed on the display panel.

FIG. 13 is a set of diagrams illustrating examples of the game image displayed on the display panel.

DESCRIPTION OF EMBODIMENT

A game device according to an embodiment executes a golf game. When a user grips and swings a rod-shaped input device, a player character in the game swings a golf club that is used as a game object. The input device according to the embodiment is, for example, tens of centimeters or smaller in length, and thus significantly shorter than real golf clubs. Therefore, the user is able to swing the input device even in a narrow space. An image of the user's swing of the input device is captured by an imaging device, and a swing path of the input device is reflected in a swing path of the golf club in the game. As a result, the user is able to play the golf game while feeling as if the user is really hitting a ball with the golf club.

Figure 1:
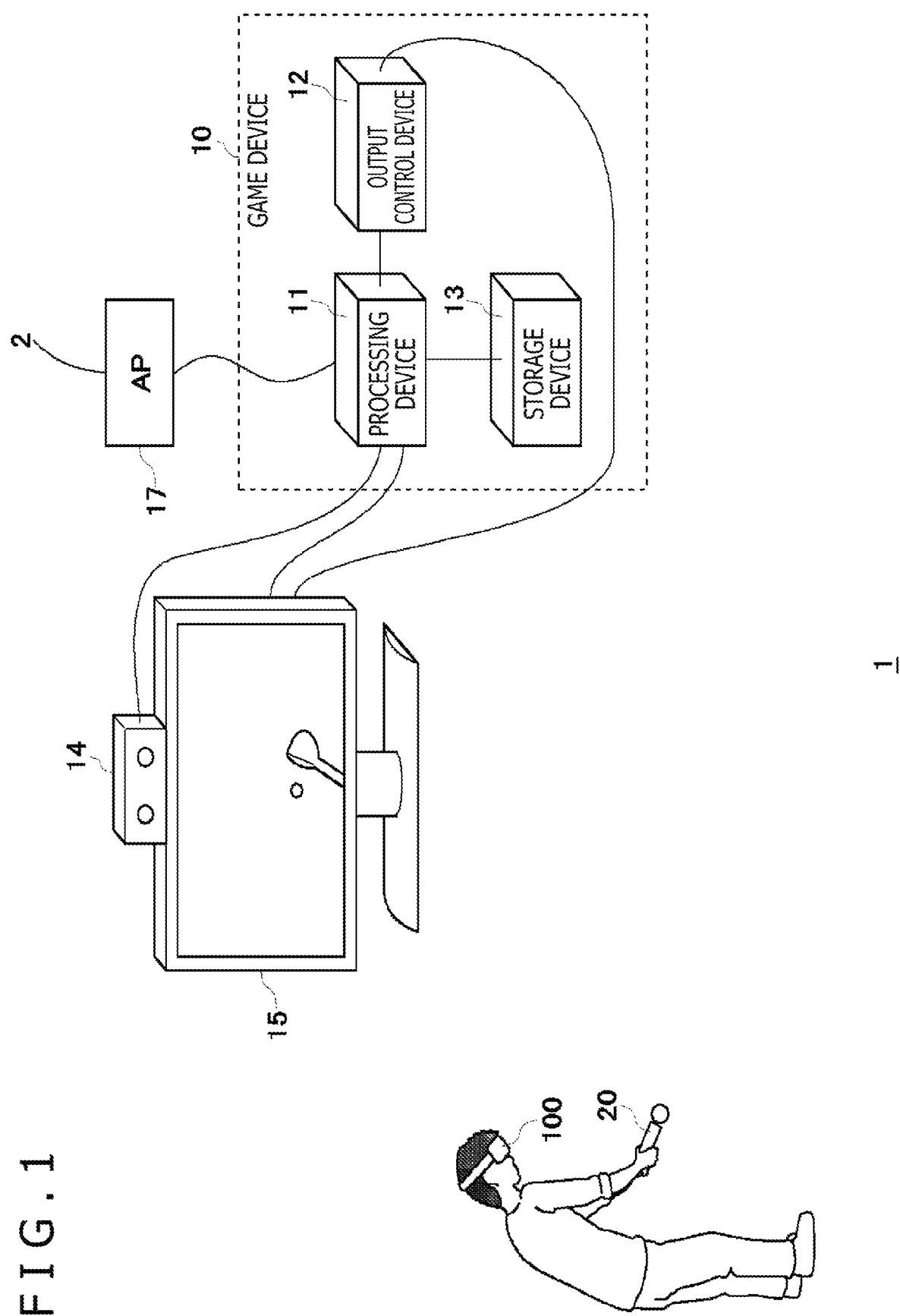
FIG. 1 is a diagram illustrating a configuration example of a game system according to an embodiment.

FIG. 1 is a diagram illustrating a configuration example of a game system 1 according to the embodiment. The game system 1 includes a game device 10, a head-mounted display (HMD) 100, an input device 20, an imaging device 14, and an output device 15. The HMD 100 is mounted on the head of the user. The input device 20 is gripped by the hands of the user. The imaging device 14 captures images of the HMD 100 and the input device 20. The output device 15 outputs images and sounds. The game device 10 is to be connected to the Internet or other external network 2 through an access point (AP) 17. The AP 17 is capable of functioning as a wireless access point and as a router. The game device 10 may be connected to the AP 17 via a cable or a known wireless communication protocol.

The HMD 100 is a display device that is mounted on the user's head to display an image on a display panel positioned in front of the eyes of the user. The HMD 100 separately displays a left-eye image on a left-eye display panel and a right-eye image on a right-eye display panel. These images form a parallax image as viewed from left and right points of view, and thus provide stereoscopic vision. As the user views the display panel through an optical lens, the game device 10 obtains parallax image data by correcting lens-induced optical distortion and supplies the obtained parallax image data to the HMD 100.

The HMD 100 provides the user with a video world of virtual reality (VR). The sense of immersion into the video world can be enhanced by providing the game system 1 with a head-tracking function and updating a displayed image in conjunction with a motion of the user's head. The game device 10 according to the embodiment generates an image of a virtual golf course that is to be viewed by the player character, and supplies the generated image to the HMD 100.

The input device 20 is an operation input device that the user uses to issue operating instructions. The input device 20 is capable of transmitting the user's operating instructions to the game device 10. In the embodiment, the input device 20 is configured as a wireless controller that is able to wirelessly communicate with the game device 10. The input device 20 and the game device 10 may establish a wireless connection by using the Bluetooth (registered trademark) protocol.

The input device 20, which is driven by a battery, includes a plurality of buttons that issue operating instructions for causing the game to progress. When the user issues operating instructions by operating the buttons on the input device 20, the issued operating instructions are wirelessly transmitted to the game device 10. The game device 10 receives the operating instructions from the input device 20, controls the progress of the game in accordance with the operating instructions, and generates game image data and game sound data. The game image data and sound data are supplied to the HMD 100 and the output device 15. The input device 20 is not limited to a wireless controller, and may alternatively be a wired controller that is connected to the game device 10 via a cable.

The output device 15 outputs images and sounds. Upon receiving the image and sound data generated by the game device 10, the output device 15 outputs game images and game sounds. The output device 15 may be a television set having a display and a speaker or a computer display. The output device 15 may be connected to the game device 10 via a wired cable or wirelessly connected to the game device 10, for example, via a wireless local area network (LAN).

The game device 10 includes a processing device 11, an output control device 12, and a storage device 13. The processing device 11 is a terminal that receives operating instructions from the input device 20 and executes an application such as a game. The processing device 11 according to the embodiment is capable of causing the game to progress upon receiving posture information and position information of the HMD 100 and posture information and position information of the input device 20 as the user's operating instructions for the game. The processing device 11 generates game image data and game sound data, and supplies the game image data and the game sound data to the output control device 12 and the output device 15. The output control device 12 is a processing unit that supplies the image and sound data generated by the processing device 11 to the HMD 100, and is configured to supply the parallax image data obtained by correcting optical distortion caused by the lens of the HMD 100 to the HMD 100. The output control device 12 may be connected to the HMD 100 via a cable or a known wireless communication protocol.

As the user views images by using the HMD 100, the output device 15 is not always necessary for the user wearing the HMD 100. However, when the output device 15 is prepared for use, another user is able to view images displayed on the output device 15. The processing device 11 may cause the output device 15 to display the same image as viewed by the user wearing the HMD 100 or display a different image. For example, in a case where a user wearing an HMD and another user play a game together, the output device 15 may display a game image as viewed from the point of view of a character of the other user.

The imaging device 14 is a video camera including, for example, a charge coupled device (CCD) image sensor or a complementary metal oxide semiconductor (CMOS) image sensor, and used to capture an image of a real space at predetermined intervals and generate a frame image of each interval. It is preferable that the imaging device 14 be a stereo camera, and that the processing device 11 be able to measure, from a captured image, a distance to a target object. An imaging rate of the imaging device 14 may be set to 60 images per second and thus equal to a frame rate of the output device 15. The imaging device 14 is to be connected to the game device 10 via a universal serial bus (USB) or another interface.

The processing device 11, the storage device 13, the output device 15, the input device 20, and the imaging device 14 may form a conventional game system. In such a case, the processing device 11 functions as an information processing device that executes the game, and the input device 20 functions as a game controller for supplying the user's operating instructions for the game to the processing device 11. The storage device 13 stores, for example, system software and game software. Adding the output control device 12 and the HMD 100 to the components of the above-mentioned conventional game system builds the game system 1 that supplies VR images of a virtual three-dimensional space to the HMD 100.

Functions exercised by the output control device 12 may be incorporated into the processing device 11. In other words, a processing unit of the game device 10 may include one processing device 11 or include the processing device 11 and the output control device 12. Subsequently, functions of supplying VR images to the HMD 100 will be collectively described below as the functions of the game device 10.

Markers (tracking light emitting diodes (LEDs)) are disposed in the HMD 100 in order to track the user's head. The game device 10 detects a motion of the HMD 100 on the basis of positions of the markers included in a captured image. A posture sensor (acceleration sensor and gyro sensor) may be mounted on the HMD 100 so as to let the game device 10 acquire sensor data detected by the posture sensor from the HMD 100 and utilize both the acquired sensor data and the captured image of the markers to perform a highprecision tracking process. As regards the tracking process, various methods have been conventionally proposed. The game device 10 may adopt any tracking method as long as it detects the motion of the HMD 100.

The input device 20 has a rod-shaped housing to be gripped by the user. A luminous body is disposed at a tip of the housing. The luminous body of the input device 20 is able to emit light of different colors. In accordance with light emission instructions from the game device 10, the luminous body is able to change the color of the emitted light. The housing is substantially shaped like a cylinder. A plurality of operation buttons are mounted on a surface of the housing. During the game, the luminous body emits light of a predetermined color, and the game device 10 derives position information of the luminous body in the real space from a position and a size of the luminous body appearing in the captured image. The game device 10 handles the position information of the luminous body as operating instructions for the game and causes a motion of the golf club to reflect the position information. The game device 10 according to the embodiment is capable of processing the golf game by using not only the operation inputs, for example, from the buttons on the input device 20, but also the derived position information of the luminous body.

The input device 20 includes a posture sensor that includes an acceleration sensor and a gyro sensor. Sensor data is transmitted to the game device 10 at predetermined intervals, and the game device 10 acquires the sensor data to obtain posture information of the input device 20 in the real space. The game device 10 handles the posture information as operating instructions for the game, and causes the processing of the game to reflect the posture information.

The golf game according to the embodiment is such that a gaze direction of the player character is determined based on the posture information of the HMD 100 mounted on the user's head. The game device 10 handles the posture information of the HMD 100 as gaze direction change instructions for a game image. Therefore, the display panel of the HMD 100 displays a shaft and a head of the golf club and a ball when the user faces downward, and displays a golf course where the ball is to be hit when the user faces forward. The output device 15 depicted in FIG. 1 displays a game image same as that on the display panel of the HMD 100, that is, a state where a part of the shaft, the club head, and the ball are displayed.

By performing a head-tracking process on the user, the game device 10 detects the position and the posture of the user's head (the HMD 100 in reality) in the real space. In this instance, the position of the HMD 100 is represented by position coordinates in a three-dimensional space whose origin is at a reference position. The reference position may be represented by position coordinates (latitude and longitude) obtained when the HMD 100 is turned on. Further, the posture of the HMD 100 is represented by a three-axis tilt with respect to a reference posture in the three-dimensional space. The reference posture is a posture obtained when the gaze direction of the user is horizontal. The reference posture may be set when the HMD 100 is turned on.

The game device 10 is able to detect the position and the posture of the HMD 100 only from the sensor data detected by the posture sensor of the HMD 100. Further, the game device 10 is able to accurately detect the position and the posture of the HMD 100 by performing an image analysis on the image of the markers (tracking LEDs) of the HMD 100 that is captured by the imaging device 14. The game device 10 according to the embodiment calculates the position of the player character in the virtual three-dimensional space on the basis of the position information of the HMD 100, and calculates the gaze direction of the player character on the basis of the posture information of the HMD 100.

Figure 2:
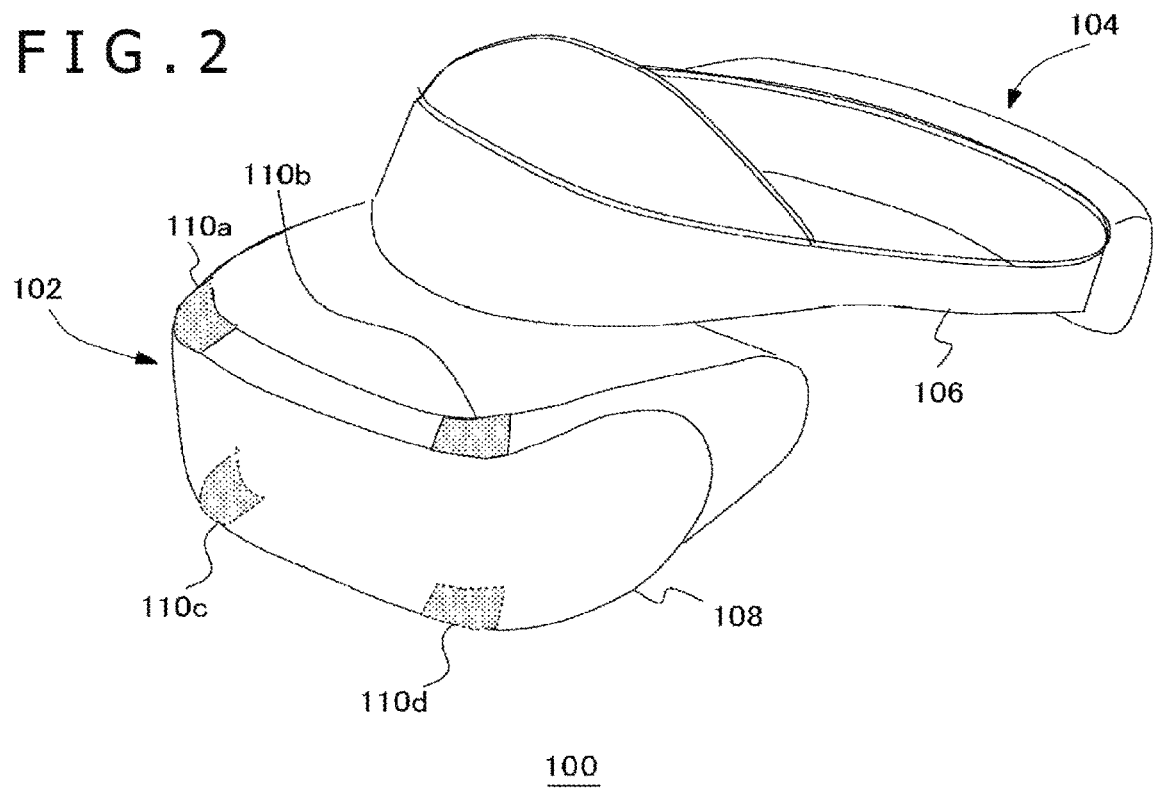
FIG. 2 is a diagram illustrating an example of an external shape of an HMD.

FIG. 2 illustrates an example of an external shape of the HMD 100. The HMD 100 includes an output mechanism section 102 and a mounting mechanism section 104. The mounting mechanism section 104 includes a mounting band 106 that fastens the HMD 100 to the whole circumference of the user's head when the user wears the HMD 100. The mounting band 106 has a material or a structure that enables the user to adjust a length of the mounting band 106 until it fits on the circumference of the user's head.

The output mechanism section 102 includes a housing 108 and a display panel. The housing 108 is shaped so as to cover the left and right eyes of the user when the user wears the HMD 100. The display panel is disposed inside the housing 108 and adapted to face the eyes of the user when the user wears the HMD 100. The display panel may be, for example, a liquid-crystal panel or an organic electroluminescence (EL) panel. A pair of left and right optical lenses are further disposed in the housing 108. The optical lenses are positioned between the display panel and the user's eyes to increase a viewing angle of the user. The HMD 100 may further include speakers and earphones positioned to match the ears of the user. Moreover, the HMD 100 may be configured to be connectable to external headphones.

A plurality of light-emitting markers 110a, 110b, 110c, and 110d are disposed on an outer surface of the housing 108. In the present example, the tracking LEDs are used as the light-emitting markers 110. However, different types of markers may alternatively be used. Any markers may be used as long as they can be imaged by the imaging device 14 and their positions can be subjected to image analysis by the game device 10. The number of light-emitting markers 110 and their positions are not particularly limited. However, a sufficient number of light-emitting markers 110 need to be properly disposed to detect the posture of the HMD 100. In the illustrated example, the light-emitting markers 110 are disposed at four front corners of the housing 108. Further, the light-emitting markers 110 may be disposed on sides and rear of the mounting band 106 in such a manner that the image of the light-emitting markers 110 can be captured even when the back of the user faces the imaging device 14.

Figure 3:
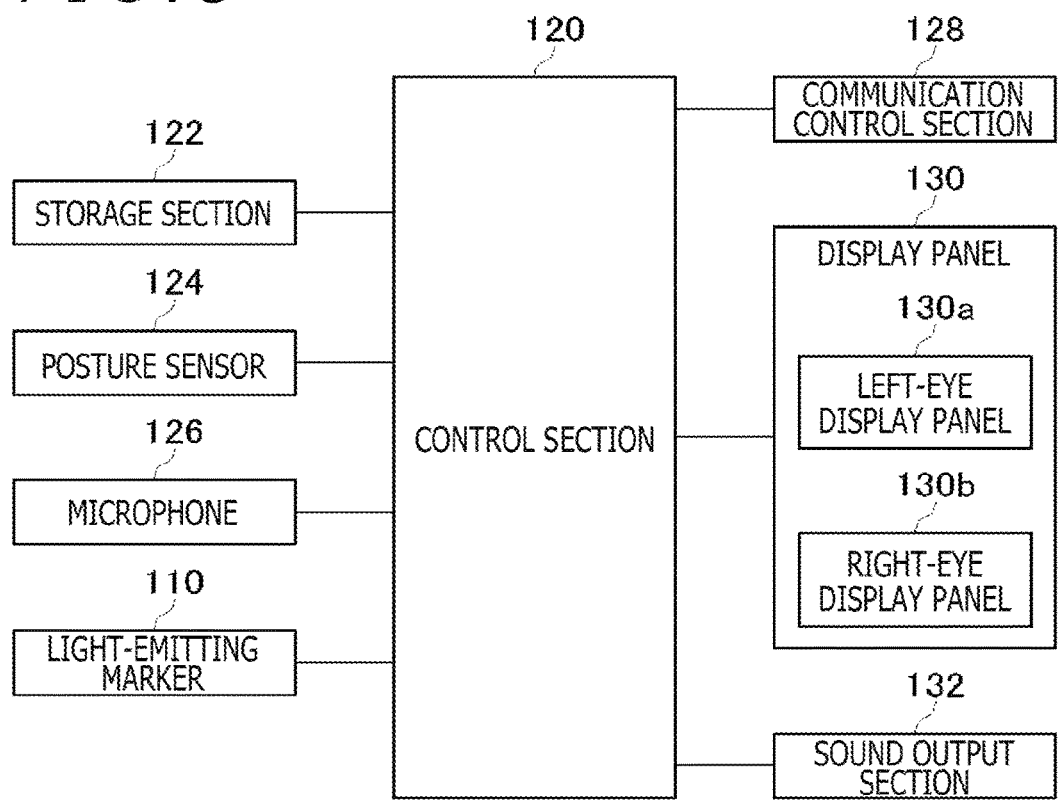
FIG. 3 is a diagram illustrating functional blocks of the HMD.

FIG. 3 illustrates functional blocks of the HMD 100. A control section 120 is a main processor that processes commands and various kinds of data such as image data, sound data, and sensor data, and outputs the results of processing. A storage section 122 temporarily stores, for example, data and commands to be processed by the control section 120. A posture sensor 124 detects the posture information of the HMD 100. The posture sensor 124 includes at least a three-axis acceleration sensor and a three-axis gyro sensor.

A communication control section 128 establishes wired or wireless communication through a network adapter or an antenna, and transmits data outputted from the control section 120 to the external game device 10. Further, the communication control section 128 establishes wired or wireless communication through the network adapter or the antenna, receives data from the game device 10, and outputs the received data to the control section 120.

Upon receiving the image data and the sound data from the game device 10, the control section 120 supplies the received data to a display panel 130 for the purpose of image display, and further supplies the received data to a sound output section 132 for the purpose of sound output. The display panel 130 includes a left-eye display panel 130a and a right-eye display panel 130b. The left- and right-eye display panels display a pair of parallax images. Further, the control section 120 causes the communication control section 128 to transmit the sensor data, which is received from the posture sensor 124, and the sound data, which is received from a microphone 126, to the game device 10.

FIG. 4 illustrates an example of an external shape of the input device 20. Depicted in (a) of FIG. 4 is an upper surface configuration of the input device 20. Depicted in (b) of FIG. 4 is a lower surface configuration of the input device 20. The input device 20 includes a luminous body 22 and a handle 24. The outside of the luminous body 22 is made of optically transparent resin and formed into a sphere. The inside of the luminous body 22 includes a light-emitting element such as a light-emitting diode or an electric light bulb. When the light-emitting element inside the luminous body 22 emits light, the whole outer surface of the sphere illuminates. The handle 24 has a longitudinal housing. An input section including operation buttons 30, 32, 34, 36, and 38 is disposed on an upper surface of the handle 24. Another input section including an operation button 40 is disposed on a lower surface of the handle 24. As the operation buttons 30, 32, 34, 36, and 38 are pushdown-type buttons, they operate when pushed down by the user. The operation button 40 may be capable of inputting an analog quantity.

Figure 5:
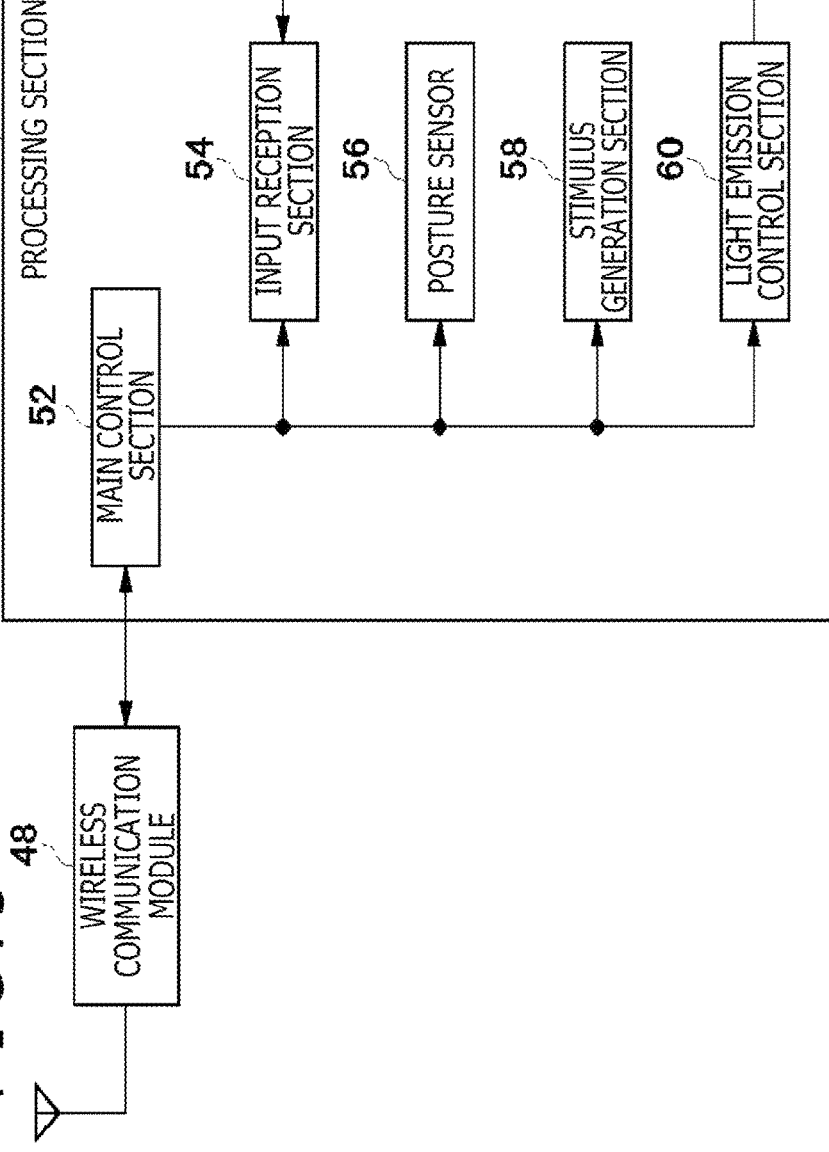
FIG. 5 is a diagram illustrating functional blocks of the input device.

FIG. 5 illustrates functional blocks of the input device 20. The input device 20 includes a wireless communication module 48, a processing section 50, a light-emitting section 62, and the operation buttons 30, 32, 34, 36, 38, and 40. The wireless communication module 48 is capable of transmitting and receiving data to and from a wireless communication module of the game device 10. The processing section 50 performs a process intended by the input device 20.

The processing section 50 includes a main control section 52, an input reception section 54, a posture sensor 56, a stimulus generation section 58, and a light emission control section 60. The main control section 52 transmits and receives necessary data to and from the wireless communication module 48.

The input reception section 54 receives information inputted from the operation buttons 30, 32, 34, 36, 38, and 40, and sends the inputted information to the main control section 52. The posture sensor 56 includes a three-axis acceleration sensor and a three-axis gyro sensor. The posture sensor 56 is disposed in the handle 24 of the input device 20, and preferably positioned near the center in the handle 24. The wireless communication module 48 transmits data inputted by operating the operation buttons and sensor data detected by the posture sensor 56 to the wireless communication module of the game device 10 at predetermined intervals.

The light emission control section 60 controls the light emission from the light-emitting section 62. The light-emitting section 62 includes a red LED 64a, a green LED 64b, and a blue LED 64c, and is able to emit light of different colors. The light emission control section 60 adjusts the light emission from the red LED 64a, the green LED 64b, and the blue LED 64c, so that the light-emitting section 62 emits light of a desired color.

Upon receiving light emission instructions from the game device 10, the wireless communication module 48 supplies the light emission instructions to the main control section 52. Then, the main control section 52 supplies the light emission instructions to the light emission control section 60. The light emission control section 60 controls the light emission from the red LED 64a, the green LED 64b, and the blue LED 64c in such a manner that the light-emitting section 62 emits light of a color designated by the light emission instructions. For example, the light emission control section 60 may provide pulse width modulation (PWM) control of each LED for purposes of light emission control.

The stimulus generation section 58 generates a stimulus that is to be given to the user's hands gripping the input device 20. Upon receiving drive instructions from the game device 10, the wireless communication module 48 supplies the drive instructions to the main control section 52. Then, the main control section 52 supplies the drive instructions to the stimulus generation section 58. This causes the stimulus generation section 58 to generate the stimulus. The stimulus generation section 58 may include a vibrator for vibrating the housing of the handle 24. The stimulus generation section 58 may generate a stimulus other than a vibration stimulus, such as an electric stimulus, a heat stimulus, a cold stimulus, or a pressure stimulus.

Figure 6:
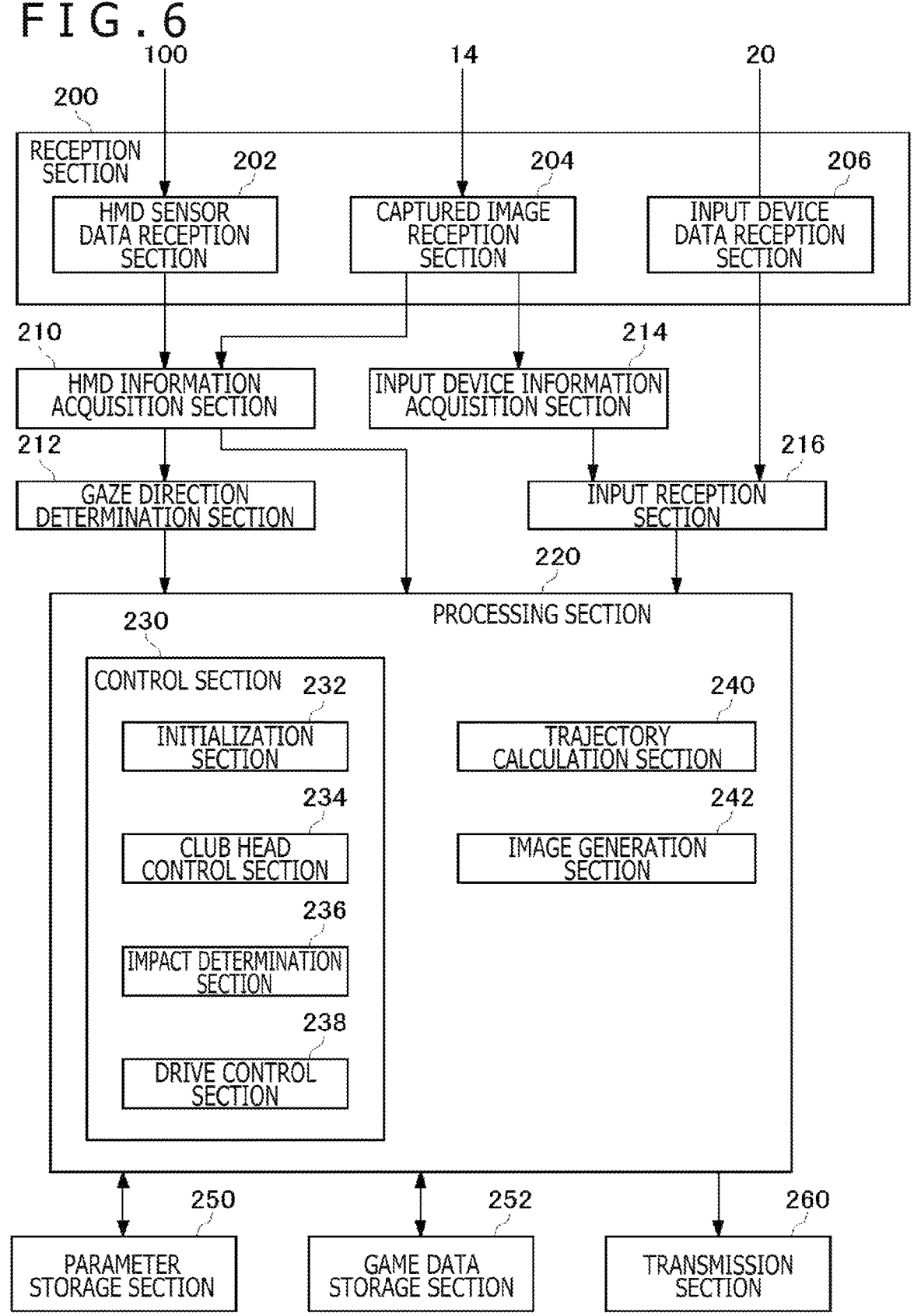
FIG. 6 is a diagram illustrating functional blocks of a game device.

FIG. 6 illustrates functional blocks of the game device 10. The game device 10 includes, as an input/output interface with the outside, a reception section 200 and a transmission section 260. The game device 10 further includes an HMD information acquisition section 210, a gaze direction determination section 212, an input device information acquisition section 214, an input reception section 216, a processing section 220, a parameter storage section 250, and a game data storage section 252.

Referring to FIG. 6, individual elements depicted as the functional blocks for performing various processes can be configured by hardware, such as a circuit block, a memory, or other large-scale integrations (LSIs), and implemented by software, such as a program loaded into a memory. Therefore, it will be understood by those skilled in the art that the functional blocks may be variously implemented by hardware only, by software only, or by a combination of hardware and software. The method of implementing the functional blocks is not specifically limited.

An HMD sensor data reception section 202 receives sensor data at predetermined intervals from the posture sensor 124 of the HMD 100 worn by the user, and supplies the received sensor data to the HMD information acquisition section 210. For example, the intervals of transmission from the HMD 100 may be set to 11.25 msec. A captured image reception section 204 receives captured images of the HMD 100 and the input device 20 at predetermined intervals from the imaging device 14, and supplies the received images to the HMD information acquisition section 210 and the input device information acquisition section 214. For example, the imaging device 14 may capture an image of a forward space at 1/60-second intervals, and the captured image reception section 204 may receive the captured image at 1/60-second intervals. An input device data reception section 206 receives, at predetermined intervals, the sensor data from the posture sensor 56 of the input device 20 gripped by the user and the data inputted from the various operation buttons. For example, the intervals of transmission from the input device 20 may be set to 11.25 msec. The input device data reception section 206 supplies, to the input reception section 216, the sensor data received from the posture sensor 56 and the data inputted from the various operation buttons.

From the sensor data of the HMD 100 and the image of the light-emitting markers 110 appearing in the captured image, the HMD information acquisition section 210 acquires the posture information indicating the posture of the HMD 100 in the real space and the position information indicating the position of the HMD 100. The HMD information acquisition section 210 identifies a change in the posture of the HMD 100 from the sensor data obtained by the three-axis gyro sensor. Further, the HMD information acquisition section 210 calculates a tilt of the light-emitting markers 110 for tracking, which appear in the captured image, and acquires the posture information of the HMD 100 by using the calculated tilt and the sensor data obtained by the three-axis gyro sensor. Moreover, the HMD information acquisition section 210 calculates an amount of movement from the reference position by using the sensor data obtained by the three-axis acceleration sensor, and acquires the position information of the HMD 100. The HMD information acquisition section 210 supplies the posture information of the HMD 100 to the gaze direction determination section 212, and supplies the position information to the processing section 220.

The gaze direction determination section 212 determines the gaze direction of the user on the basis of the posture information of the HMD 100. The gaze direction determination section 212 converts the posture information of the HMD 100 to the user's gaze direction. The gaze direction determination section 212 supplies the determined gaze direction to the processing section 220. In the processing section 220, an image generation section 242 uses the gaze direction, which is supplied from the gaze direction determination section 212, as operation information for determining the gaze of the player character. The golf game according to the embodiment is such that the image generation section 242 sets the position and the direction of a virtual camera in a game space on the basis of the supplied position information and gaze direction.

From the image of the luminous body 22 appearing in the captured image, the input device information acquisition section 214 acquires an operation input indicating a motion of the input device 20. More specifically, on the basis of individual captured images, the input device information acquisition section 214 derives the position information of the luminous body 22 in the real space from the position and the size of the image of the luminous body 22 appearing in the captured image. The position information of the luminous body 22 appearing in each captured image forms the operation input indicating the motion of the input device 20.

The input device information acquisition section 214 may generate a binarized image by performing a binarization process on captured image data with a predetermined threshold value. When the binarization process is performed, a pixel value of a pixel having higher brightness than the predetermined threshold value is encoded to "1," and a pixel value of a pixel having brightness equal to or lower than the predetermined threshold value is encoded to "0." When the luminous body 22 is illuminated with brightness higher than the predetermined threshold value, the input device information acquisition section 214 is able to identify the position and the size of a luminous body image from the binarized image. For example, the input device information acquisition section 214 identifies barycentric coordinates of the luminous body image in the captured image and a radius of the luminous body image.

From the identified position and size of the luminous body image, the input device information acquisition section 214 derives the position information of the input device 20 as viewed from the imaging device 14. The input device information acquisition section 214 derives position coordinates within camera coordinates from the barycentric coordinates of the luminous body image, and derives distance information indicative of a distance from the imaging device 14 from the radius of the luminous body image. The position coordinates and the distance information form the position information of the input device 20. The input device information acquisition section 214 derives the position information of the input device 20 on the basis of individual captured images, and supplies the derived position information to the input reception section 216.

The input reception section 216 receives the position information of the input device 20, the sensor data from the posture sensor 56, and the data inputted from the various operation buttons, and supplies the received information and data to the processing section 220.

The processing section 220 includes a control section 230, a trajectory calculation section 240, and the image generation section 242. The control section 230 includes an initialization section 232, a club head control section 234, an impact determination section 236, and a drive control section 238.

In the golf game according to the embodiment, when the user grips and swings the input device 20 like a golf club, the input reception section 216 receives an operation input indicating the motion of the input device 20, and the control section 230 controls the motion of the player character acting as a golf player in the game space in accordance with the operation input. In accordance with the operation input indicating the motion of the input device 20, the control section 230 calculates a swing path of the golf club. The trajectory calculation section 240 calculates a trajectory of the ball by considering the swing path calculated by the control section 230, an angle of a club face at the time of impact, a club head speed, and a spot of the club face that is stricken by the ball (impact spot).

The parameter storage section 250 stores parameters necessary for the progress of the golf game. The parameter storage section 250 may store impact parameters for determining an impact between a club head and the ball. The impact parameters may set a play mode for selecting a difficulty level of the game or set impact determination characteristics related to performance of each golf club type. The impact parameters may be set to define a beginner mode such that the ball strikes the center of the club face even if the relative positional relation between the club head and the ball is slightly impaired at the time of impact, and define an expert mode such that the ball's impact spot of the club face is calculated based only on the relative positional relation between the club head and the ball. Further, the impact parameters may be set to define the performance of the golf club such that the ball does not easily strike the center of the club face although a flight distance of the ball easily increases, or conversely define the performance of the golf club such that the ball easily strikes the center of the club face although the flight distance of the ball does not easily increase.

The game data storage section 252 stores game data such as a program for the golf game. The control section 230 reads the program from the game data storage section 252, executes the read program, and controls the motion of the player character and the motion of the golf club held by the player character in accordance with a user's operation input. The image generation section 242 generates an image of the game controlled by the control section 230, and the transmission section 260 transmits the game image to the HMD 100 and the output device 15.

The initialization section 232 initializes the position of the HMD 100 in the real space. The position initialized by the initialization section 232 corresponds to the reference position of the head of the player character in the game space. A height of the player character is selected when the player character is selected by the user. The control section 230 calculates the position of the head of the player character in the game space by calculating an amount of deviation from the initialized position in the real space.

Figure 7:
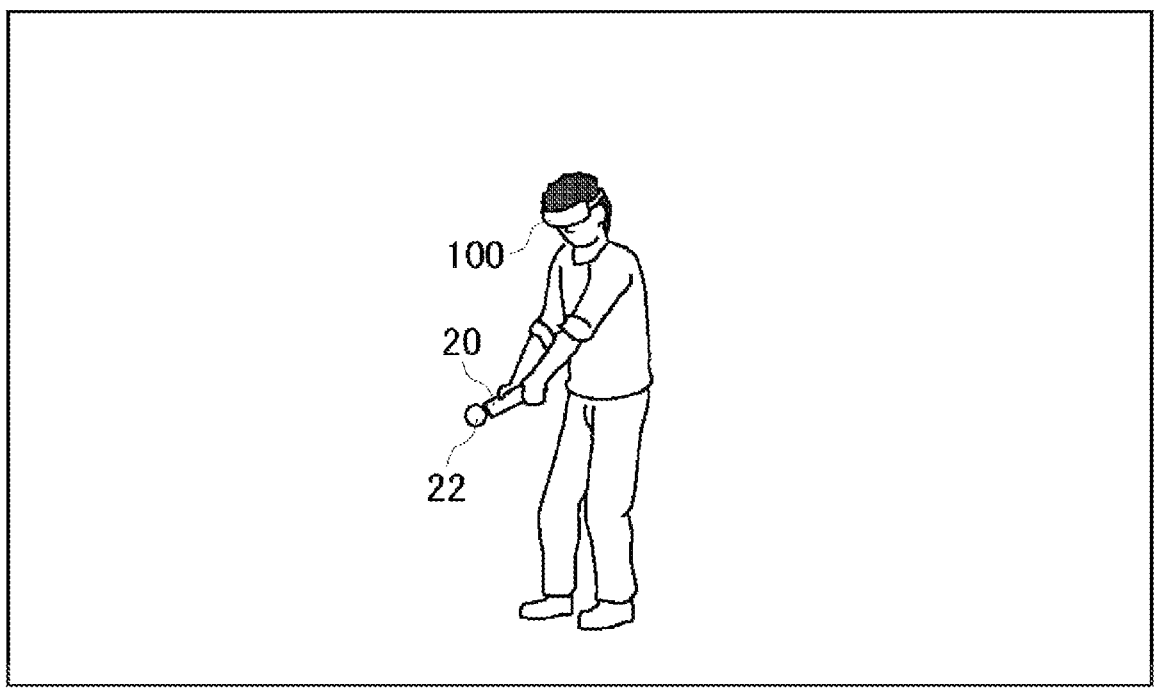
FIG. 7 is a diagram illustrating a state where a user is in an address posture.

FIG. 7 illustrates a state where the user is in an address posture. While the input device 20 is gripped by the user, the club head control section 234 determines an orientation of the golf club and a position of the club head in a world coordinate system on the basis of the posture of the input device 20 and the position of the luminous body 22. A length of the golf club may be determined by the type of an employed golf club. Further, a position of a golf club grip when the golf club faces the ground may be set based on the height of the player character. Based on the posture information of the input device 20 and the position information of the luminous body 22, the club head control section 234 extends the input device 20 in a longitudinal direction and disposes the golf club whose grip is gripped by the player character in the world coordinate system.

The club head control section 234 acquires the position information and the posture information of the input device 20 at predetermined intervals from the input reception section 216, and calculates the swing path of the golf club in the world coordinate system, that is, the path of the club head. The club head control section 234 supplies the calculated swing path of the golf club to the image generation section 242. Then, the image generation section 242 generates a swing video of the golf club, which is a game object, in accordance with the supplied swing path.

The impact determination section 236 acquires, from the club head control section 234, the relative positional relation between the club head and the ball. The impact determination section 236 references the impact parameters stored in the parameter storage section 250, and determines whether the club head hits the ball. When it is determined that the club head hits the ball, the impact determination section 236 identifies the spot of the club face that is stricken by the ball, and supplies the identified spot to the trajectory calculation section 240.

The above-described method of determining the impact between the club head and the ball is merely an example. Therefore, an alternative method may be adopted. As mentioned earlier, the play modes, such as the beginner mode and the expert mode, and the impact parameters, which represent, for example, the performance of the golf club, adjust a difficulty level of impact determination. This makes it possible to provide game properties representing, for example, skills of the user.

The trajectory calculation section 240 calculates the trajectory of the impacted ball. From the angle of the club face, the swing path of the golf club, the club head speed, and the spot of the club face that is stricken by the ball, the trajectory calculation section 240 determines an initial speed, a direction, and a spin of the ball, and calculates the trajectory. The trajectory calculation section 240 acquires the calculated swing path of the golf club from the club head control section 234, and acquires the club face spot stricken by the ball from the impact determination section 236.

The trajectory calculation section 240 acquires the angle of the face of the golf club, which is a game object, from the sensor data obtained by the three-axis gyro sensor included in the posture sensor 56 of the input device 20. The sensor data obtained by the three-axis gyro sensor of the input device 20 forms the posture information of the input device 20. The parameter storage section 250 has a correspondence table indicating the correspondence between the sensor data obtained by the three-axis gyro sensor of the input device 20 and the angle of the club face of an employed golf club. The trajectory calculation section 240 references the correspondence table to acquire the club face angle.

The trajectory calculation section 240 acquires the club head speed of the golf club from the sensor data obtained by the three-axis acceleration sensor included in the posture sensor 56 of the input device 20. The parameter storage section 250 has a correspondence table indicating the correspondence between the club head speed of the employed golf club and the sensor data obtained by the three-axis acceleration sensor. The trajectory calculation section 240 references the correspondence table to acquire the club head speed.

The trajectory calculation section 240 may calculate a power of impact on the basis of the employed golf club, the swing path, and the club head speed, and determine the initial speed from the calculated power. At the moment of impact, the calculated power may be displayed in a format indicating the percentage of the maximum power. When the left side of the ball is hit, the trajectory calculation section 240 may bend the trajectory of the ball rightward to calculate the trajectory of a slice ball. When the right side of the ball is hit, the trajectory calculation section 240 may bend the trajectory of the ball leftward to calculate the trajectory of a hook ball.

After determining the initial speed, the direction, and the spin of the ball, the trajectory calculation section 240 calculates the position of the ball on the basis of individual frame images while adjusting the speed of the ball according to a force applied to the ball. The trajectory calculation section 240 adds the speed of the ball to the coordinates of the current position of the ball in a frame in order to calculate the coordinates of the position of the ball in the next frame. Gravity, lift, wind power, and air resistance are added to the speed of the ball on the basis of individual frames. According to the laws of physics, the gravity is 9.8 m/sec$^2$ downward. The lift is calculated from the orientation of the club head at the time of impact and the swing path, and proportional to the square of the ball speed. The wind power may be at a fixed speed in a fixed direction at all locations of a hole or may vary from one location to another. The air resistance is oriented in a direction opposite a direction of travel and is proportional to the speed. As described above, the trajectory of the ball is calculated in consideration of the direction and speed of wind. This makes it possible to create a difficulty in making a shot while considering the influence of wind, as is the case with real golf playing, and thus provide a more realistic golf game.

The image generation section 242 generates a game image by setting the position and the direction of the virtual camera in the game space on the basis of the position of the HMD 100, which is acquired by the HMD information acquisition section 210, and with the gaze direction determined by the gaze direction determination section 212.

Depicted in (a) of FIG. 8 is an example of the game image displayed on the display panel 130 of the HMD 100. Before swinging the input device 20, the user takes an address posture in order to confirm the relative positional relation between a club head 304 of a golf club 302 and a ball 300. Depicted in (a) of FIG. 8 is an example of the game image that is displayed when the user is in the address posture. While looking at the ball 300 placed on the ground, the user adjusts the position of the golf club 302 and confirms the address posture throughout the swing.

Depicted in (b) of FIG. 8 is an example of the game image that is displayed on the display panel 130 immediately after impact. The user in the address posture swings the input device 20 back, and then builds momentum to swing the input device 20 forward. Depicted in (b) of FIG. 8 is a state where the ball 300 is forcibly hit.

Figure 9:
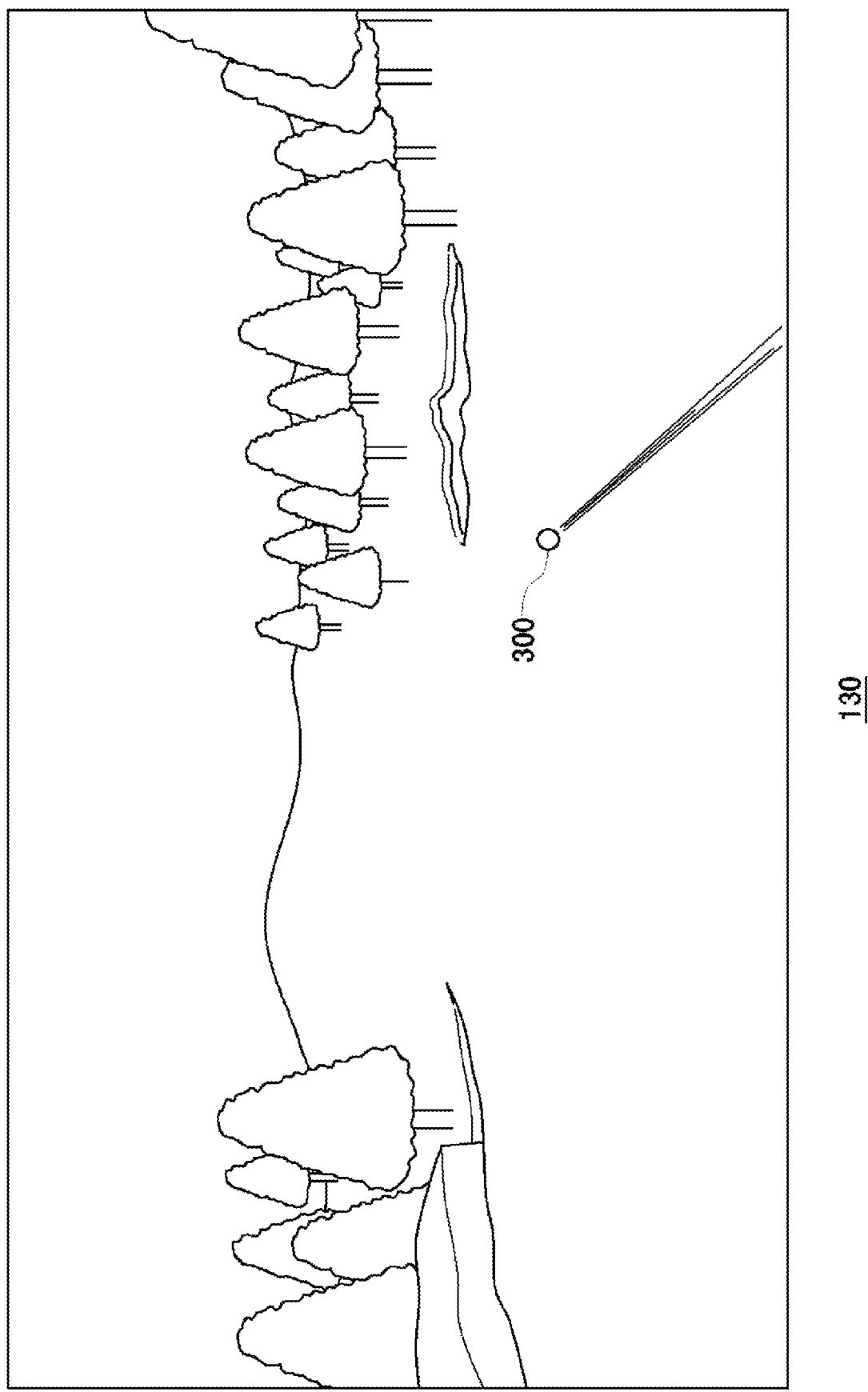
FIG. 9 is a diagram illustrating an example of the game image displayed on the display panel.

FIG. 9 illustrates an example of the game image displayed on the display panel 130. When the user swings the input device 20, the force applied to the input device 20 by the user causes the user to face in the direction in which the ball is hit. Therefore, the display panel 130 displays a state where the ball flies toward a flagstick. As described above, the image generation section 242 generates, on the basis of the gaze direction, the game image to be displayed on the display panel 130. The game image may be displayed by the output device 15.

In the game system 1 according to the embodiment, the user uses the input device 20, which is not more than tens of centimeters in length, as a game controller. A ratio in the real space between the height of the user and the length of the input device 20 is higher than a ratio in the game space between the height of the player character and the length of the golf club. In the game system 1, using the input device 20 shorter than a real golf club as the game controller allows the user to fully swing even in a narrow space. Particularly, the user wearing the HMD 100 is unable to see the outside world. Therefore, the user is able to safely enjoy the golf game by using the short input device 20.

As mentioned earlier, before swinging the input device 20, the user takes an address posture in order to confirm the relative positional relation between the club head 304 and the ball 300. In this instance, the game image depicted in (a) of FIG. 8 appears on the display panel 130. However, the image displayed on the display panel 130 is a top view of the ball 300. Therefore, it is difficult to grasp the positional relation in a height direction between the club head 304 and the ball 300.

In real golfing, the user places the club head on the ground behind the ball in order to confirm the position of the ground. In the golf game according to the embodiment, the club head control section 234 determines whether or not the golf club held by the player character comes into contact with the ground in the game space. When the golf club comes into contact with the ground, the drive control section 238 drives the stimulus generation section 58 disposed in the input device 20 so as to stimulate the hands of the user gripping the input device 20 and thus notify the user that the golf club is brought into contact with the ground. In the embodiment, the stimulus generation section 58 includes a vibrator for generating vibration, the drive control section 238 generates a drive signal for driving the vibrator, and the transmission section 260 transmits the drive signal to the input device 20.

The club head control section 234 compares a position in the height direction of the ground with a position in the height direction of a tip of the golf club in the world coordinate system expressing the game space. More specifically, the club head control section 234 calculates a position in the height direction of an underside of the club head 304 in the world coordinate system (Y-axis coordinate value) from the posture information of the input device 20 and the position information of the luminous body 22, and compares the calculated position with the position in the height direction of the ground. When the club head control section 234 determines, as a result of comparison, that the position in the height direction of the tip of the golf club is lower than the position in the height direction of the ground, the drive control section 238 generates a drive signal for driving the stimulus generation section 58 in the input device 20.

If the user takes an address posture so as to place the luminous body 22 in an excessively low position, the club head control section 234 determines that the position in the height direction of the tip of the golf club is lower than the position in the height direction of the ground. Therefore, in order to notify the user of the ground position, the drive control section 238 generates the drive signal for driving the stimulus generation section 58, and the transmission section 260 transmits the drive signal to the input device 20. Upon receiving drive instructions from the game device 10, the wireless communication module 48 in the input device 20 supplies the drive instructions to the main control section 52. Then, the main control section 52 supplies the drive instructions to the stimulus generation section 58. This causes the stimulus generation section 58 to generate a stimulus. When the generated stimulus is given to the user, the user recognizes that the club head has reached the ground.

Based on a difference between the position in the height direction of the tip of the golf club and the position in the height direction of the ground, the drive control section 238 may adjust a level of the stimulus to be generated. In other words, the drive control section 238 may generate the drive signal in such a manner that the generated stimulus increases with an increase in a value obtained by subtracting the position in the height direction of the tip of the golf club from the position in the height direction of the ground. Such changes in the level of the stimulus enable the user to recognize a depth by which the club head is pushed into a virtual ground, and thus estimate a height to which the input device 20 should be lifted.

As described above, the control section 230 according to the embodiment is capable of driving the stimulus generation section 58 disposed in the input device 20 and stimulating the hands of the user gripping the input device 20 when the golf club comes into contact with the ground. This enables the user to intuitively recognize that an excessively lowered input device 20 and thus confirm the correct address posture.

If the golf club held by the player character comes into contact with the ground in the game space while the input reception section 216 is receiving a user's operation input from a predetermined input section of the input device 20, the drive control section 238 may drive the stimulus generation section 58 disposed in the input device 20. In this manner, the user may be enabled to confirm the position of the ground while pressing a predetermined input section.

Further, if the golf club held by the player character comes into contact with the ground in the game space while the user is facing downward, the drive control section 238 may drive the stimulus generation section 58 disposed in the input device 20. Whether or not the user is facing downward may be determined by the gaze direction supplied from the gaze direction determination section 212. If the drive control section 238 determines from the gaze direction that the user is facing downward when the club head control section 234 determines that the golf club held by the player character comes into contact with the ground in the game space, the drive signal for driving the stimulus generation section 58 may be generated. When confirming the ground, the user always faces downward. Therefore, conversely, if the user is not facing downward, the club head control section 234 does not have to check for contact between the golf club and the ground.

When the position in the height direction of the tip of the golf club is lower than the position in the height direction of the ground, the image generation section 242 may generate an image indicating that the golf club is in contact with the ground.

Depicted in (a) of FIG. 10 is an example of the game image displayed on the display panel 130. In this example, the image generation section 242 directly depicts the positional relation between the ground and operation buttons 30. Thus, this example indicates a state where the club head 304 at the tip of the shaft is buried in the ground. The image generation section 242 may directly depict the positional relation as described above in order to notify the user that the user should lift the input device 20.

Depicted in (b) of FIG. 10 is another example of the game image displayed on the display panel 130. In this example, the image generation section 242 generates an image mimicking the motion of a real golf club. In the real world, when the user presses a grounded golf club from above, the club head slides along the ground in a direction away from the body of the user. The image generation section 242 may generate an image depicting such a motion in order to notify that the user should lift the input device 20.

In order to avoid inconsistency in the game image, the image generation section 242 may generate a display image depicting the club head 304 not pushed into the ground by reducing the length of the shaft according to the value obtained by subtracting the position in the height direction of the tip of the golf club from the position in the height direction of the ground. In such an instance, the image generation section 242 may change a color of the ground or a surrounding color in order to notify the user that the position in the height direction of the underside of the club head 304 is lower than the position in the height direction of the ground.

In some cases, the user wants to issue instructions for the game during a play, for example, for the purpose of changing the golf club or temporarily halt the play. It is preferable that the image generation section 242 display a menu image listing various selectable instructions in response to a simple operation of the input device 20.

Figure 11:
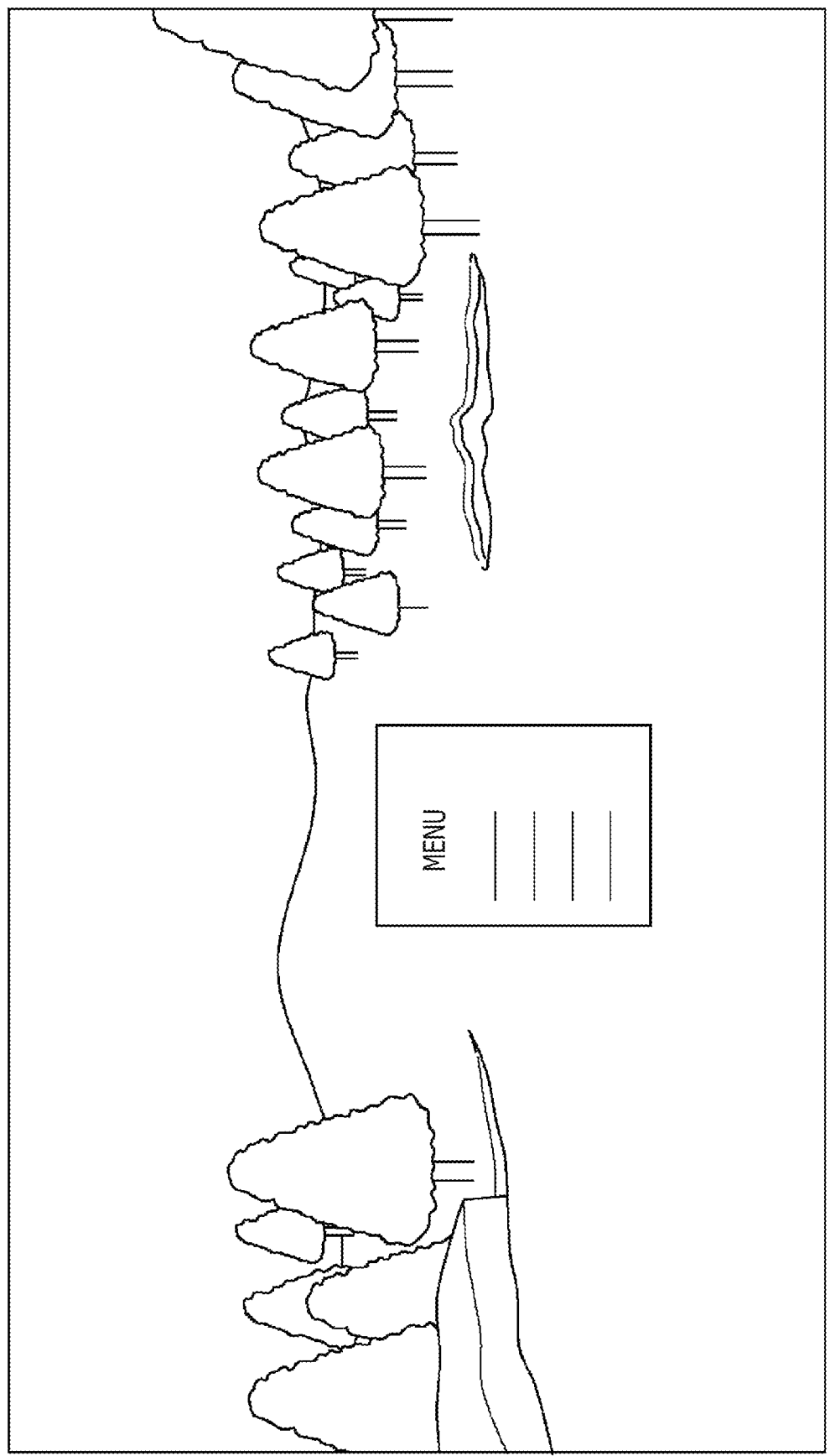
FIG. 11 is a diagram illustrating an example of a menu image displayed in a game space.

FIG. 11 illustrates an example of the menu image displayed in the game space. When the user holds the input device 20 with the luminous body 22 positioned upward and with the face of the user positioned within a predetermined distance from the luminous body 22, the image generation section 242 displays the menu image. Upon determining from the posture information of the input device 20 that the input device 20 is facing upward, and determining from the position information of the input device 20 and the position information of the HMD 100 that the input device 20 is within a predetermined distance from the HMD 100, the image generation section 242 receives instructions for displaying the menu image. As described above, the user is able to call the menu image by performing a simple operation.

The present invention has been described based on the embodiment. It is to be understood by those skilled in the art that the embodiment is illustrative, and that a combination of the components and processes described in conjunction with the embodiment can be variously modified, and further that such modifications can be made without departing from the spirit and scope of the present invention.

The golf game may be such that a practice swing mode is selectable to allow the user to swing the input device 20 for practice purposes. When the user swings the input device 20 in the practice swing mode, a plurality of club head images are displayed as still images on the path of the club head in order to allow the user to confirm the path of the club head. For example, while the input reception section 216 is receiving a user's operation input from a predetermined input section of the input device 20, the processing section 220 may receive an operation input indicating the motion of the input device 20 as an operation input in the practice swing mode.

When performing a practice swing in real golfing, the user swings the golf club at a position slightly rearward from the ball in order to prevent the club head from hitting the ball. In the golf game according to a modified embodiment, the user does not have to step back in order to prevent the club head from hitting the ball, and is allowed to perform a swing at a position where the club head hits the ball. In the practice swing mode, the processing section 220 performs processes, for example, of calculating the path of the club head, checking for contact between the club head and the ball, and calculating a swing speed. However, even if the ball exists in the path of the club head, the processing section 220 does not perform a process of hitting the ball forward.

Even in the practice swing mode, the impact determination section 236 acquires the relative positional relation between the club head and the ball from the club head control section 234. The impact determination section 236 references the impact parameters stored in the parameter storage section 250 and determines whether the club head hits the ball. The trajectory calculation section 240 acquires the club head speed of the golf club from the sensor data obtained by the three-axis acceleration sensor included in the posture sensor 56 of the input device 20.

Depicted in (a) of FIG. 12 is an example of the game image displayed after a practice swing in the practice swing mode. After the user swings the input device 20 in the practice swing mode, the image generation section 242 displays a plurality of club head images 306a, 306b, 306c, 306d, and 306e on the path of the club head 304 in accordance with the path of the club head 304, which is calculated by the club head control section 234, and with the club head speed acquired by the trajectory calculation section 240. The image generation section 242 may display the club head images 306 in a predetermined color (e.g., blue).

The club head image 306c represents an image of the club head 304 that is captured when it passes near the ball 300. An arrow 320 may indicate the direction of the club head 304 when it passes near the ball 300. In the example in (a) of FIG. 12, as the input device 20 is swung by the user along the path of the club head 304 hitting the ball 300, the club head image 306c depicts a state where the ball 300 is hit. As mentioned earlier, the ball 300 does not fly in the practice swing mode.

The image generation section 242 displays the club head images 306a and 306b at positions earlier than the club head image 306c, and displays the club head images 306d and 306e at positions later than the club head image 306c. Intervals between the club head images 306 may be determined according to the club head speed. For example, the club head images 306a to 306e may be displayed at positions on the swing path at predetermined time intervals (e.g., at 0.1-second intervals) with respect to the club head image 306c.

It is preferable that the image generation section 242 display the club head images 306 at positions earlier and later than the club head image 306c near the ball 300. In the present example, the image generation section 242 displays two club head images 306 before and after the club head image 306c. This enables the user to confirm the path of the club head 304 by using a plurality of still images.

Depicted in (b) of FIG. 12 is another example of the game image displayed after a practice swing in the practice swing mode. After the user swings the input device 20 in the practice swing mode, the image generation section 242 displays a plurality of club head images 308a, 308b, 308c, 308d, and 308e on the path of the club head 304 in accordance with the path of the club head 304, which is calculated by the club head control section 234, and with the club head speed acquired by the trajectory calculation section 240.

The club head image 308c indicates the position of the club head 304 when it passes near the ball 300. In the present example, the club head image 308c indicates that the golf club 302 has passed the position at which the golf club 302 hits the ball 300 during a practice swing. As is the case with (a) of FIG. 12, the image generation section 242 displays the club head images 308a and 308b at positions earlier than the club head image 308c, and displays the club head images 308d and 308e at positions later than the club head image 308c. The club head images 308a to 308e may be displayed at positions on the swing path at predetermined time intervals (e.g., at 0.1-second intervals) with respect to the club head image 308c.

A comparison between (a) and (b) of FIG. 12 reveals that the intervals between the club head images 306 are longer than the intervals between the club head images 308. The long intervals between the club head images 306 indicate a high club head speed, and the short intervals between the club head images 308 indicate a low club head speed. The club head speed is a factor determining a distance the ball 300 flies. Therefore, the user is able to confirm the swing speed by swinging the input device 20 in the practice swing mode for practicing purposes. The image generation section 242 does not display the club head images after a swing in a regular game mode. However, the image generation section 242 may display the club head images in accordance with a user's request.

Depicted in (a) of FIG. 13 is another example of the game image displayed after a practice swing in the practice swing mode. In this practice swing mode, a putter is selected by the user. Therefore, the image generation section 242 displays a plurality of club head images 310a to 310e mimicking the club head 304 of the putter on the path of the club head 304. For example, when the user selects an iron, the image generation section 242 displays a club head image of the iron. As described above, it is preferable that the image generation section 242 display a club head image according to the golf club used by the player character.

Depicted in (b) of FIG. 13 is another example of the game image displayed after a practice swing in the practice swing mode. In this example, as the ball 300 does not exist on the path of the club head 304, the user misses the ball 300 when the user swings the input device 20. In accordance with the path of the club head 304, which is calculated by the club head control section 234, and with the club head speed acquired by the trajectory calculation section 240, the image generation section 242 displays a plurality of club head images 312a, 312b, 312c, 312d, and 312e on the path of the club head 304. The image generation section 242 may display the club head images 312 in a color (i.e., red color) different from the color used when the ball 300 is hit by the club head 304.

The club head image 312c represents an image of the club head 304 that is captured when it passes near the ball 300. The arrow 320 indicates the direction of the club head 304 when it passes near the ball 300. In the example in (b) of FIG. 13, as the ball 300 is not hit by the club head 304, the arrow 320 need not always be displayed.

The image generation section 242 disposes the club head images 312a and 312b at positions earlier than the club head image 312c, and disposes the club head images 312d and 312e at positions later than the club head image 312c. The club head images 312a to 312e may be displayed on the swing path at predetermined time intervals (e.g., at 0.1-second intervals) with respect to the club head image 312c.

By viewing the path indicated by the club head images 312, the user confirms that the ball 300 is not hit by the club head 304. As described above, the user utilizes the practice swing mode for practicing purposes, and thus conducts studies about a good swing for hitting the ball 300 with the club head 304. Further, when the color of the club head images 312 is made different from the color used when the ball 300 is hit by the club head 304, the user readily recognizes that the user has missed the ball 300.

Figure 14:
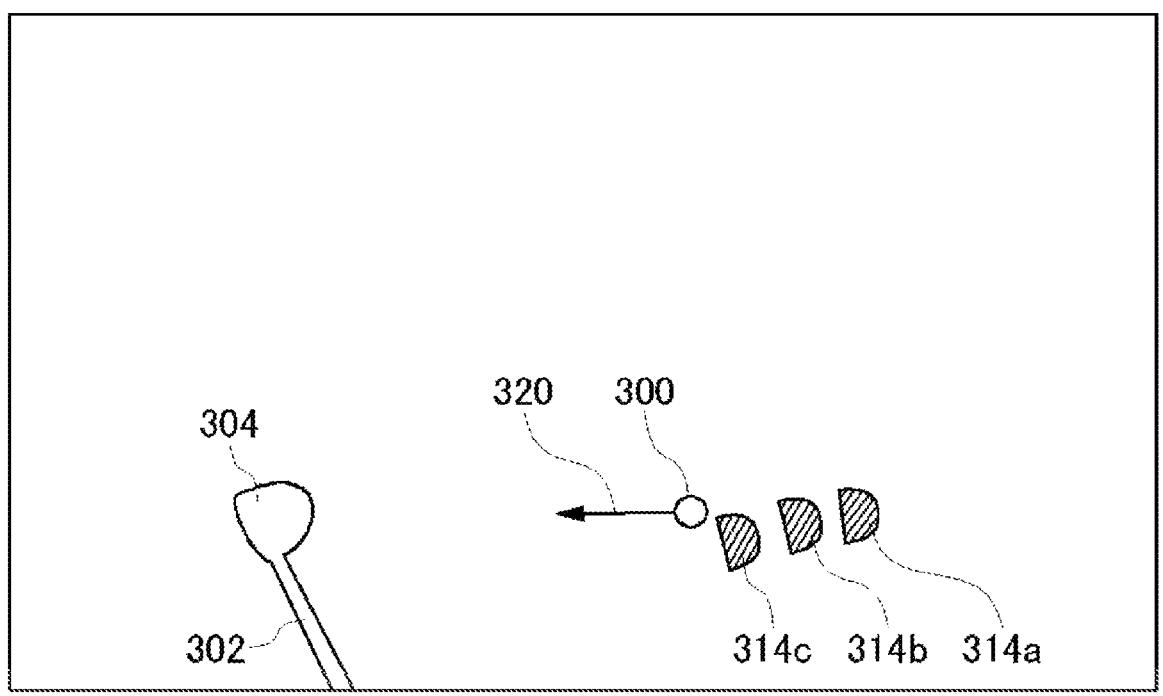
FIG. 14 is a diagram illustrating an example of the game image displayed on the display panel.

FIG. 14 illustrates another example of the game image displayed after a practice swing in the practice swing mode. FIG. 14 depicts an example image displayed when the club head 304 is pushed into the ground due to a bad swing (duff). When the club head 304 is pushed into the ground, the image generation section 242 may delete displayed club head images 314 as indicated in (a) of FIG. 10. This example depicts a state where no subsequent club head images are displayed because the club head 304 is pushed into the ground at a point on the path that is ahead of a club head image 314c. As described above, the practice swing mode allows the user to view the club head images and confirm the user's swing.

In the game system 1, it is difficult for the user to confirm the location of the imaging device 14 in the real space because the user wears the HMD 100. Therefore, it is possible that the back of the user may face the imaging device 14. Meanwhile, as the game device 10 acquires the posture information of the HMD 100 by using a captured image of the HMD 100, the light-emitting markers 110 of the HMD 100 need to be properly imaged. In view of such circumstances, the image generation section 242 may display a mark in the game space so as to indicate the direction in which the user should face (i.e., the direction in which the imaging device 14 exists). This mark may be displayed when the HMD 100 is oriented at an angle greater than a predetermined angle from a facing direction with respect to the imaging device 14, and may be not displayed when the HMD 100 is oriented squarely to the imaging device 14.

In recent years, there are an increasing number of opportunities for live broadcasts of electronic sports (e-sports) to become delivered worldwide. Although streaming is often delivered through websites, television broadcasting is also performed. In conjunction with the embodiment, FIG. 1 illustrates a configuration of the game system 1. However, in a case where the game image generated by the processing device 11 is streaming-delivered for e-sports, a plurality of processing devices 11 may be prepared for a plurality of users, so that the game images from the individual processing devices 11 are selected by switchers and delivered to the network 2 through the AP 17.

REFERENCE SIGNS LIST

1 . . . Game system
10 . . . Game device
14 . . . Imaging device
15 . . . Output device
20 . . . Input device
22 . . . Luminous body
100 . . . HMD
130 . . . Display panel
200 . . . Reception section
210 . . . HMD information acquisition section
212 . . . Gaze direction determination section
214 . . . Input device information acquisition section 216 . . . Input reception section
220 . . . Processing section
230 . . . Control section
232 . . . Initialization section
234 . . . Club head control section
236 . . . Impact determination section
238 . . . Drive control section
240 . . . Trajectory calculation section
242 . . . Image generation section
250 . . . Parameter storage section
252 . . . Game data storage section
260 . . . Transmission section

INDUSTRIAL APPLICABILITY

The present invention can be applied to golf games.

The invention claimed is:

1. A game device comprising:
an input reception section that receives an operation input indicating a motion of an input device gripped by hands of a user;
a control section that controls a motion of a player character in a game space in accordance with the operation input; and
an image generation section that generates a game image,
wherein, when a golf club held by the player character comes into contact with a ground in the game space, the control section drives a stimulus generation section disposed in the input device to stimulate the user's hands gripping the input device; and
wherein, during an address posture phase, before the player character takes a swing with the golf club in the game space, the control section adjusts a level of the stimulus so as to enable the user to recognize a degree to which a head of the golf club contacts the ground as a result of the user urging the input device toward and away from a floor in real space, the adjustment in the level of the stimulus being based on a resultant difference between a position in a height direction in the game space of the head of the golf club and a position in the height direction in the game space of the ground.

2. The game device according to claim 1, wherein the stimulus generation section is a vibrator for generating vibration.

3. The game device according to claim 1, wherein, when, in the game space, a position in a height direction of a tip of the golf club is lower than a position in the height direction of the ground, the control section drives the stimulus generation section.

4. The game device according to claim 3, wherein, based on a difference between the position in the height direction of the tip of the golf club and the position in the height direction of the ground, the control section adjusts a level of a stimulus that is to be generated.

5. The game device according to claim 3, wherein, when the position in the height direction of the tip of the golf club is lower than the position in the height direction of the ground, the image generation section generates an image indicating that the golf club is in contact with the ground.

6. The game device according to claim 1, wherein
the input device includes a rod-shaped housing portion, and
a ratio in a real space between a height of the user and a length of the input device is higher than a ratio in the game space between a height of the player character and a length of the golf club.

7. The game device according to claim 1, wherein, when the golf club held by the player character comes into contact with the ground in the game space while the input reception section is receiving a user's operation input from a predetermined input section of the input device, the control section drives the stimulus generation section disposed in the input device.

8. The game device according to claim 1, wherein, when the golf club held by the player character comes into contact with the ground in the game space while the user is facing downward, the control section drives the stimulus generation section disposed in the input device.

9. The game device according to claim 1, wherein the game image is outputted to a head-mounted display.

10. A golf game control method comprising:
receiving an operation input indicating a motion of an input device gripped by hands of a user;
controlling a motion of a player character in a game space in accordance with the operation input; and
generating a game image,
wherein, when a golf club held by the player character comes into contact with a ground in the game space, the golf game control method includes driving a stimulus generation section disposed in the input device to stimulate the user's hands gripping the input device; and
wherein, during an address posture phase, before the player character takes a swing with the golf club in the game space, the methods includes adjusting a level of the stimulus so as to enable the user to recognize a degree to which a head of the golf club contacts the ground as a result of the user urging the input device toward and away from a floor in real space, the adjustment in the level of the stimulus being based on a resultant difference between a position in a height direction in the game space of the head of the golf club and a position in the height direction in the game space of the ground.

11. A non-transitory, computer readable medium having a computer program stored thereon, which when executed by a computer, causes the computer to carry out a golf game control method by carrying out actions, comprising:
receiving an operation input indicating a motion of an input device gripped by hands of a user;
controlling a motion of a player character in a game space in accordance with the operation input; and
generating a game image,
wherein the controlling includes driving a stimulus generation section disposed in the input device to stimulate the user's hands gripping the input device when a golf club held by the player character comes into contact with a ground in the game space; and
wherein, during an address posture phase, before the player character takes a swing with the golf club in the game space, the methods includes adjusting a level of the stimulus so as to enable the user to recognize a degree to which a head of the golf club contacts the ground as a result of the user urging the input device toward and away from a floor in real space, the adjustment in the level of the stimulus being based on a resultant difference between a position in a height direction in the game space of the head of the golf club and a position in the height direction in the game space of the ground.

* * * * *